(12) United States Patent
Wang

(10) Patent No.: US 12,722,211 B2
(45) **Date of Patent: *Sep. 1, 2026**

(54) MULTI-STEP DRILL WITH ASYMMETRIC STEP PROFILES

(71) Applicant: Hongjia Wang, Shanghai (CN)

(72) Inventor: Hongjia Wang, Shanghai (CN)

(73) Assignee: Hongjia Wang, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/271,787

(22) Filed: Jul. 17, 2025

(65) Prior Publication Data

US 2026/0070132 A1 Mar. 12, 2026

Related U.S. Application Data

(63) Continuation of application No. 18/884,673, filed on Sep. 13, 2024.

(30) Foreign Application Priority Data

Feb. 18, 2024 (CN) ........................ 202410180603.8

(51) Int. Cl.
*B23B 51/00* (2006.01)
*B23B 51/02* (2006.01)

(52) U.S. Cl.
CPC ............ *B23B 51/009* (2013.01); *B23B 51/02* (2013.01); *B23B 2251/08* (2013.01);
(Continued)

(58) Field of Classification Search
CPC .............. B23B 51/009; B23B 2251/08; B23B 2251/18; B23B 2251/185; B23B 2251/282
See application file for complete search history.

(56) References Cited

U.S. PATENT DOCUMENTS 38,119 A 4/1863 Morse
248,854 A 11/1881 Gladwin
(Continued)

FOREIGN PATENT DOCUMENTS

CN 1375373 A 10/2002
CN 2623387 Y 7/2004
(Continued)

OTHER PUBLICATIONS

EP24194398.4—Extended European Search Report mailed on Nov. 18, 2024, 9 pages.
(Continued)

*Primary Examiner* — Sarang Afzali
(74) *Attorney, Agent, or Firm* — Kelly W. Cunningham; Ervin Cohen & Jessup LLP

(57) ABSTRACT

The present drill point arrangement includes a first and second land defined by a first and second flute, with a first cutting tip and a second cutting tip formed on the first and second lands respectively. The first cutting tip being positioned a first radial distance and the second cutting tip being positioned a second radial distance, each measured from the axis of rotation. The second cutting tip is positioned next in cutting tip sequence to the first cutting tip, and the second radial distance of the second cutting tip is greater than the first radial distance of the first cutting tip. Optionally, the first cutting tip is positioned a first axial distance and the second cutting tip is positioned a second axial distance, each measured from the front tip, and the second axial distance is greater than the first axial distance.

12 Claims, 10 Drawing Sheets

(52) U.S. Cl.
CPC ..... *B23B 2251/18* (2013.01); *B23B 2251/185* (2022.01); *B23B 2251/282* (2013.01); *B23B 2251/70* (2013.01)

(56) References Cited

U.S. PATENT DOCUMENTS 1,557,900 A 10/1925 Thompson
2,193,186 A 3/1940 Bannister
2,276,532 A 3/1942 Welty
2,786,373 A 3/1957 Patton
3,592,555 A 7/1971 Mackey, Sr.
3,758,222 A 9/1973 Oakes
4,189,266 A 2/1980 Koslow
4,536,107 A 8/1985 Sandy et al.
4,582,458 A 4/1986 Korb et al.
5,442,979 A 8/1995 Hsu
5,452,971 A 9/1995 Nevills
5,466,100 A 11/1995 Ahluwalia
5,503,237 A 4/1996 Neukirchen
5,636,948 A 6/1997 Rexius
5,807,039 A 9/1998 Booher et al.
5,947,659 A * 9/1999 Mays ...................... B23B 51/02 408/230
6,213,692 B1 4/2001 Guehring et al.
6,428,250 B2 8/2002 Giebmanns
6,890,133 B2 5/2005 Singh et al.
D544,892 S 6/2007 Watson et al.
7,357,606 B1 4/2008 Pettit et al.
8,029,215 B2 10/2011 Gentry et al.
8,215,206 B2 7/2012 Kozak et al.
8,485,066 B2 7/2013 Kozak et al.
8,784,017 B2 7/2014 Ibarra et al.
9,475,128 B2 10/2016 Sawabe et al.
9,500,038 B2 11/2016 Neitzell et al.
9,539,653 B2 1/2017 Rogalla et al.
9,687,915 B2 6/2017 Durfee
9,731,358 B2 8/2017 Allen et al.
10,010,332 B2 7/2018 Atabey
10,058,929 B2 8/2018 Durfee
10,086,444 B2 * 10/2018 Schwägerl .............. B23B 51/02
D840,449 S 2/2019 Wang et al.
10,328,499 B2 6/2019 Durfee
D881,957 S 4/2020 Wang
D892,183 S 8/2020 Parendo et al.
10,751,810 B2 8/2020 Wang et al.
D894,978 S 9/2020 Misumi et al.
2001/0010784 A1 8/2001 Giebmanns
2005/0053438 A1 3/2005 Wetzi et al.
2007/0020057 A1 1/2007 Chen
2009/0010728 A1 1/2009 Nishiwaki et al.
2009/0183603 A1 7/2009 Kozak et al.
2011/0116884 A1 5/2011 Li
2012/0195704 A1 * 8/2012 White ................. B23B 51/0081 408/224
2012/0201619 A1 8/2012 Olsson
2012/0301239 A1 11/2012 Prom et al.
2014/0023445 A1 1/2014 Allen
2014/0212234 A1 7/2014 Sawabe et al.
2014/0363244 A1 12/2014 Allen et al.
2014/0369776 A1 12/2014 Durfee
2017/0129022 A1 5/2017 Durfee
2017/0216979 A1 8/2017 Prom et al.
2018/0133803 A1 5/2018 Karuppoor
2018/0133808 A1 5/2018 Wang
2020/0094331 A1 3/2020 Wang
2020/0222994 A1 7/2020 Allen et al.
2021/0060662 A1 3/2021 Wang

FOREIGN PATENT DOCUMENTS

CN 101678473 A 3/2010
CN 101977713 A 2/2011
CN 102126039 A 7/2011
CN 202180238 U 4/2012
CN 103084629 A 5/2013
CN 203356678 U 12/2013
CN 203649486 U 6/2014
CN 204953985 U 1/2016
CN 205551557 U 9/2016
CN 207655965 U 7/2018
CN 207695692 U 8/2018
CN 112828351 A 5/2021
CN 214602093 U 11/2021
CN 219616177 U 9/2023
CN 117773198 A 3/2024
DE 19526686 A1 3/1996
DE 29904042 U1 7/1999
DE 20303656 U1 5/2003
DE 202011106232 U1 11/2011
DE 102022110659 A1 11/2023
EP 3967432 A1 3/2022
GB 123605 A 3/1919
GB 2318072 A 4/1998
GB 2405820 A 3/2005
JP S6316912 A 1/1988
JP 2018118363 A 8/2018
KR 200163679 Y1 2/2000
WO 9731741 A1 9/1997
WO 2008092386 A1 8/2008
WO 2012167448 A1 12/2012
WO 2013077857 A1 5/2013
WO 2017136966 A1 8/2017
WO 2018120274 A1 7/2018
WO 2019147885 A1 8/2019
WO 2020031259 A1 2/2020
WO 2020092462 A1 5/2020
WO 2020165378 A1 8/2020
WO 2023213816 A1 11/2023

OTHER PUBLICATIONS

AU2024203690—Office Action mailed on Apr. 30, 2025, 15 pages.
"National Aerospace Standard", Aerospace Industries Association of America, Inc., NAS 907, 2001, 27 pages.
Mateo Tools, "Mateo Exclusive Hyper-Step Drill Bits", 2018, 1 page.
"Tools and Manufacturing Engineers Handbook", Society of Manufacturing Engineers, 4th Edition, vol. 1, Machining, 1998, 147 pages.
Viking Drill & Tool Catalog, 2014, 3 pages.
Viking Drill & Tool Catalog, 2015, 142 pages.
EP24181576.0—European Extended Search Report mailed on Dec. 10, 2024, 10 pages.

* cited by examiner d
r2'
r2
d5
d4
d3.2
d3.1
d2.2
d2.1
lg5
lg3.2
lg2.2
lg1
lg4
lg3.1
lg2.1
d1

MULTI-STEP DRILL WITH ASYMMETRIC STEP PROFILES

CROSS-REFERENCE TO RELATED APPLICATION

This application is a continuation application of U.S. patent application Ser. No. 18/884,673, filed on Sep. 13, 2024, which claims priority to Chinese Patent Application No. 202410180603.8, titled "Multi-Step Drill with Asymmetric Step Profiles," filed Feb. 18, 2024. The contents of each of the afore-mentioned applications, including all intervening amendments thereto, are incorporated by reference herein in their entirety.

TECHNICAL FIELD

The present invention relates to the field of mechanical processing, in particular to a drilling part for a hole processing tool, such as a twist drill, a step drill, a drill tap, and the like.

BACKGROUND ART

A multi-tip or multi-stepped drilling part is used for a drilling process, in which the drilling part constitutes is integral with a hole processing tool, and includes a plurality of cutting-edge tips disposed on each chip discharging flute along a working rotational axis direction, with the cutting edges symmetrically distributed. For example, the multi-tip drilling part can be integrated at a front end of a twist drill to undertake a drilling task.

Due to the cutting edges being symmetrically distributed at each step, the cutting edges cut simultaneously with equal cutting force, which generates resonance with the same frequency and period. Additionally, the cutting resistance is large. Further, near the tip of the drill at the smaller diameter steps, the chip-discharging flute is narrow and does not readily discharge chips.

SUMMARY OF THE INVENTION

Aspects of the present invention teach certain benefits in construction and use which give rise to the exemplary advantages described below.

The present specification discloses a drill point arrangement with a drill point body comprising an acute geometry that is substantially conical from a front tip to a base and having an axis of rotation; a first flute extending from the front tip to at least the base; a second flute extending from the front tip to at least the base; a first land and a second land, the first land at least partially defined by the first flute and the second land at least partially defined by the second flute; a first cutting tip at least partially defined by the first flute and the first land, the first cutting tip being positioned a first radial distance measured from the axis of rotation; and a second cutting tip at least partially defined by the second flute and the second land, the second cutting tip being positioned a second radial distance measured from the axis of rotation, the second cutting tip is positioned next in cutting tip sequence to the first cutting tip, and the second radial distance of the second cutting tip is greater than the first radial distance of the first cutting tip.

In one or more embodiments of the drill point arrangement, the first cutting tip is positioned a first axial distance measured from the front tip and the second cutting tip is positioned a second axial distance measured from the front tip, the second axial distance of the second cutting tip is greater than the first axial distance of the first cutting tip.

Other features and advantages of aspects of the present invention will become apparent from the following more detailed description, taken in conjunction with the accompanying drawings, which illustrate, by way of example, the principles of aspects of the invention.

BRIEF DESCRIPTION OF THE DRAWINGS

The accompanying drawings illustrate aspects of the at least one non-limiting embodiment of present invention. In such drawings.

Figure 1:
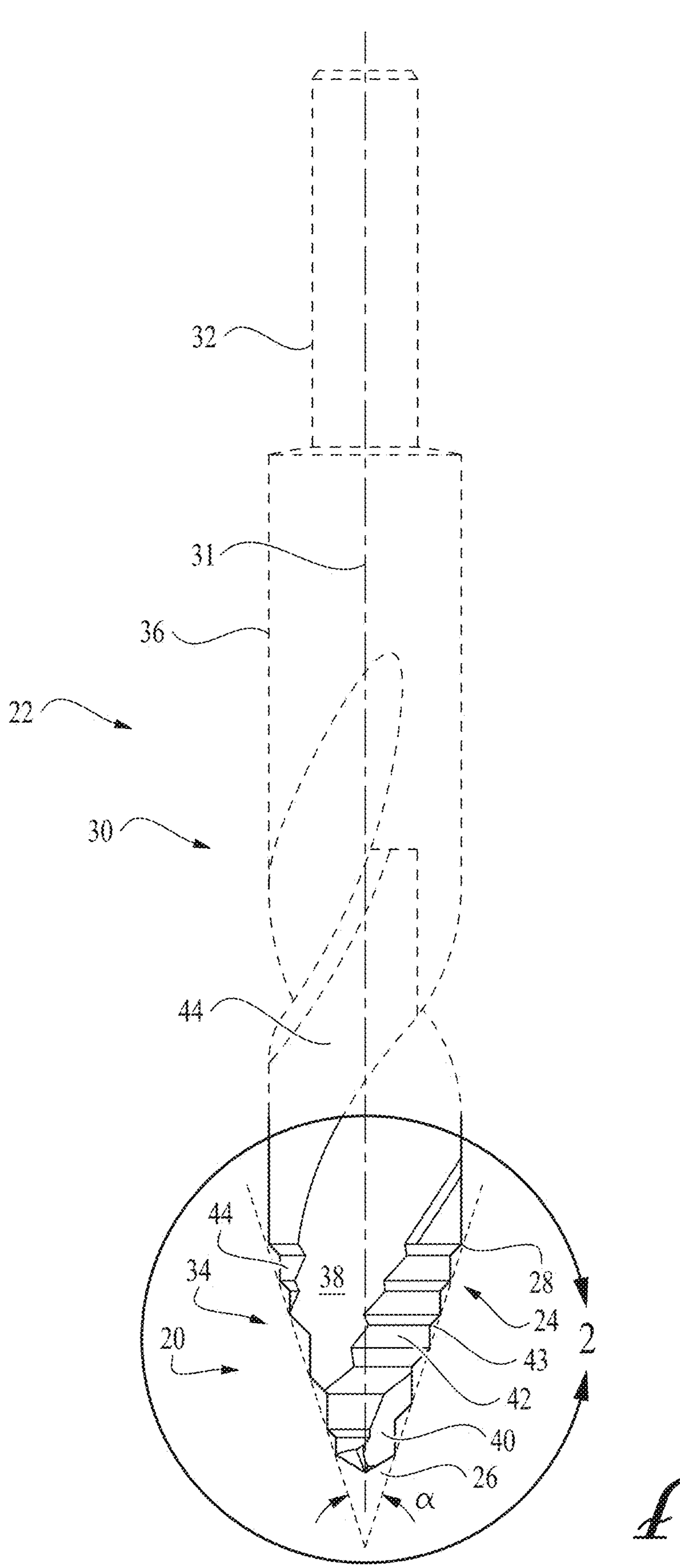
FIG. 1 is a side view of the use of an asymmetric multi-tip drilling part according to one embodiment of the present invention, integral to a twist drill illustrated in phantom.

The above-described drawing figures illustrate aspects of the invention in at least one of its exemplary embodiments, which are further defined in detail in the following description. Features, elements, and aspects of the invention that are referenced by the same numerals in different figures represent the same, equivalent, or similar features, elements, or aspects, in accordance with one or more embodiments.

DETAILED DESCRIPTION OF PREFERRED EMBODIMENTS

An illustrative embodiment of an asymmetric (or rather rotationally asymmetric) multi-tip drilling part 20 (also referred to herein as a drill point arrangement) according to the present invention is described below. In this description, for the sake of explanation only, various systems, structures and devices are schematically depicted in the drawings, but all the features of actual systems, structures and devices are not described. For example, well-known functions or structures are not described in detail to avoid unnecessary details to obscure the present invention. Of course, it should be understood that in any practical application, many specific implementation decisions need to be made to achieve the specific goals of the developer or user, and the system-related and industry-related restrictions need to be observed. These specific goals may vary with actual applications. In addition, it should be understood that although such specific implementation decisions are complicated and time-consuming, this is a routine task for those of ordinary skill in the art who benefit from the present invention.

The terms and phrases used herein should be understood and interpreted as having a meaning consistent with the understanding of those terms and phrases by those skilled in the relevant art. The consistent usage of terms or phrases herein is not intended to imply a specific definition of the term or phrase, that is, a definition that differs from the ordinary and customary meanings understood by those skilled in the art. For terms or phrases intended to have a special meaning, that is, meanings different from those understood by the skilled person, this special definition will be clearly listed in the description by definition, giving special definition to the term or phrase directly and unambiguously.

Unless the content requires, throughout the following description, the words "comprising" and its variations, such as "including", will be interpreted in an open and inclusive sense, that is, as "including but not limited to".

Figure 2:
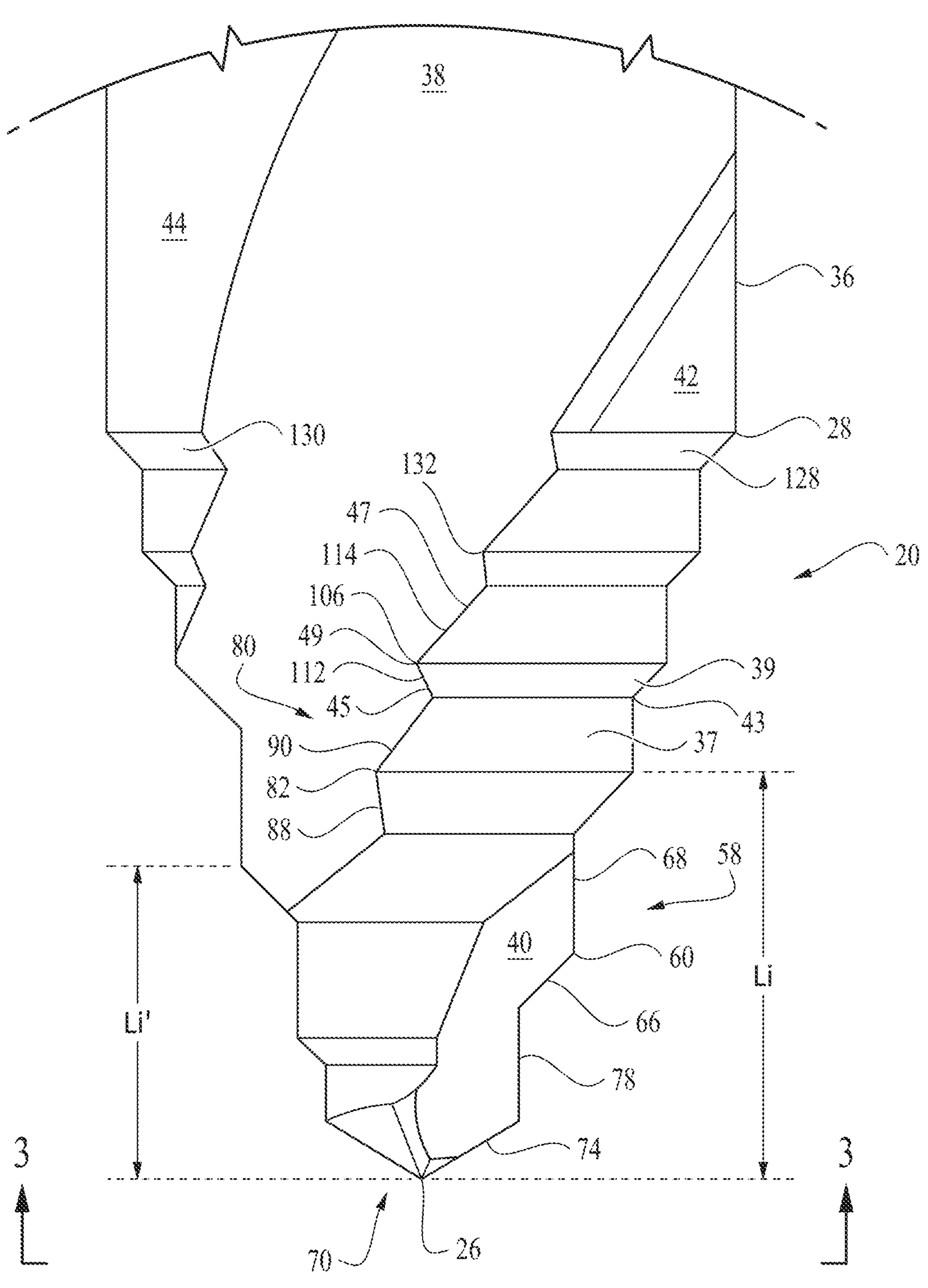
FIG. 2 is a magnified side view of the twist drill in FIG. 1.
Figure 3:
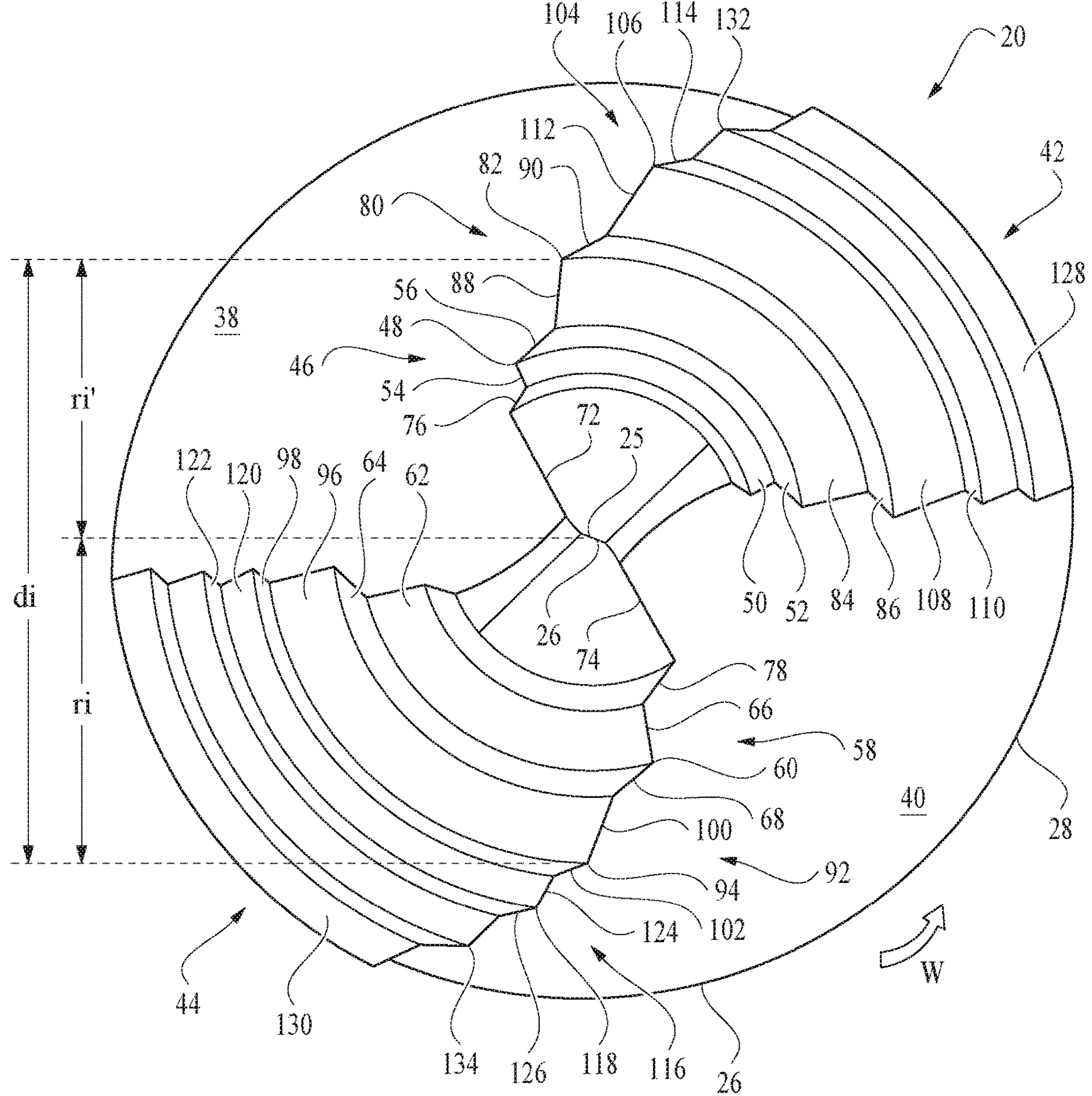
FIG. 3 is a top view of the twist drill in FIG. 1 as viewed into the axis of rotation in FIG. 2.

With reference to FIGS. 1-3, an example embodiment of an asymmetric multi-tip drilling part 20 is illustrated. Here, the drilling part 20 is exemplarily used as integrated with a front drilling part 20 of a twist drill 30 for a hole drilling of the twist drill 20. The twist drill 20 comprises a shank portion 32 and an operation portion 34 connected to the shank portion 32. The operation portion 34 comprises a cylindrical guide portion 36 connected to the shank portion 32 and a conical drilling part 24 (also referred to herein as a drill point body) connected to the guide portion 36. Chip-discharging flutes 38, 40 (also referred to herein as a first flute 38 and a second flute 40) extend over the entire drilling part 24 and partially over the guide portion 36. Here, the chip-discharging flutes 38, 40 are spirally extending chip-discharging flutes 38, 40. In another example embodiment, linear chip-discharging flutes can also be utilized. Here, there are two chip-discharging flutes 38, 40. In other embodiments, more than two (for example, three, four, . . . ) chip-discharging flutes 38, 40 can also be included. In this example embodiment, because there are two chip-discharging flutes 38 and 40, a first land 42 is defined between the first flute 38 and the second flute 40 and a second land 44 is defined between the second flute 40 and the first flute 38 opposing the first land 42, where the first land 42 and the second land 44, extend from the front tip 26 to at least the base 28, and preferably down at least part of the cylindrical guide portion 36.

Figure 4:
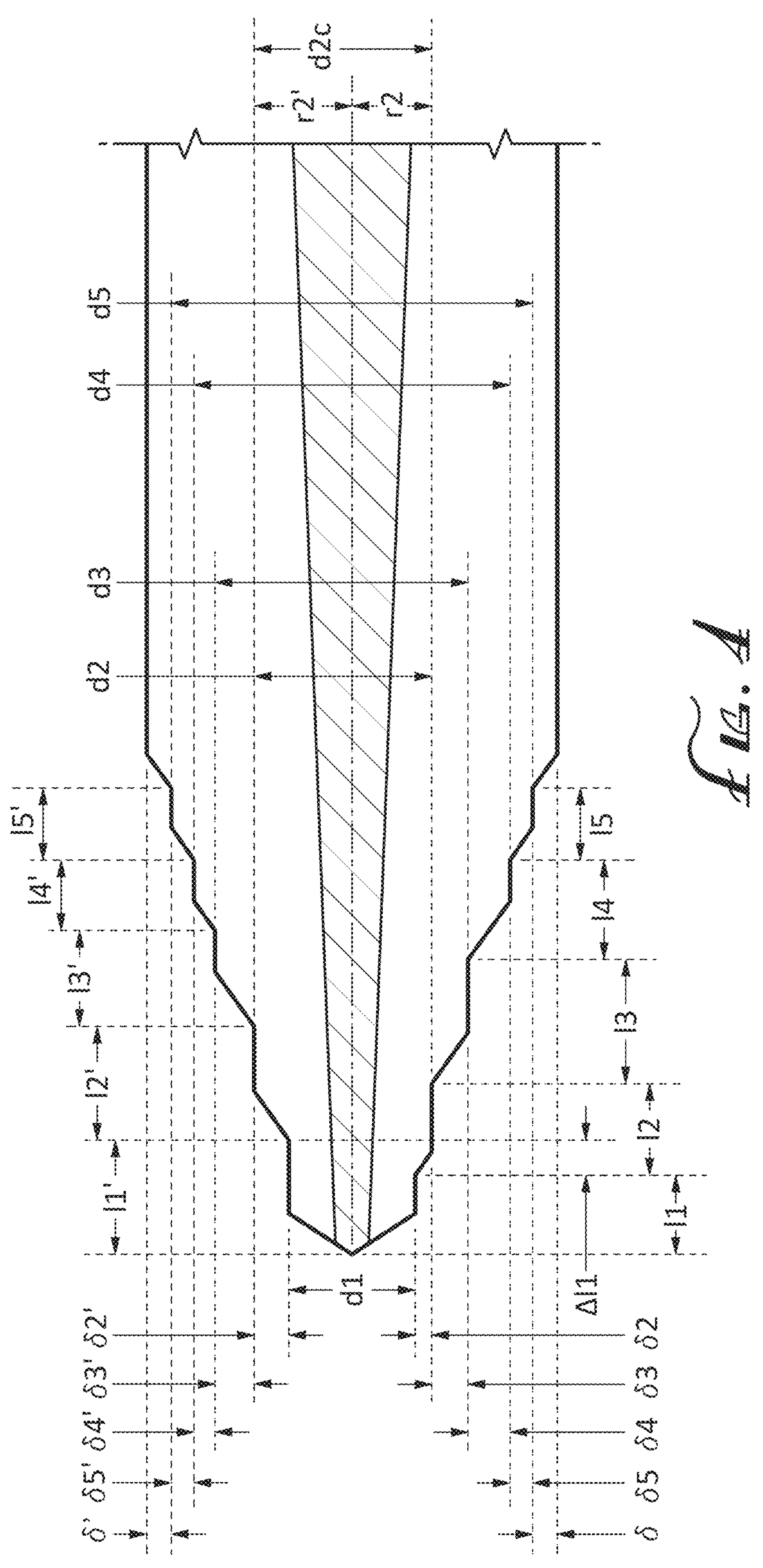
FIG. 4 is a schematic cross-sectional side view of an asymmetric multi-tip drilling part according to another example embodiment, integral to a twist drill.
Figure 5:
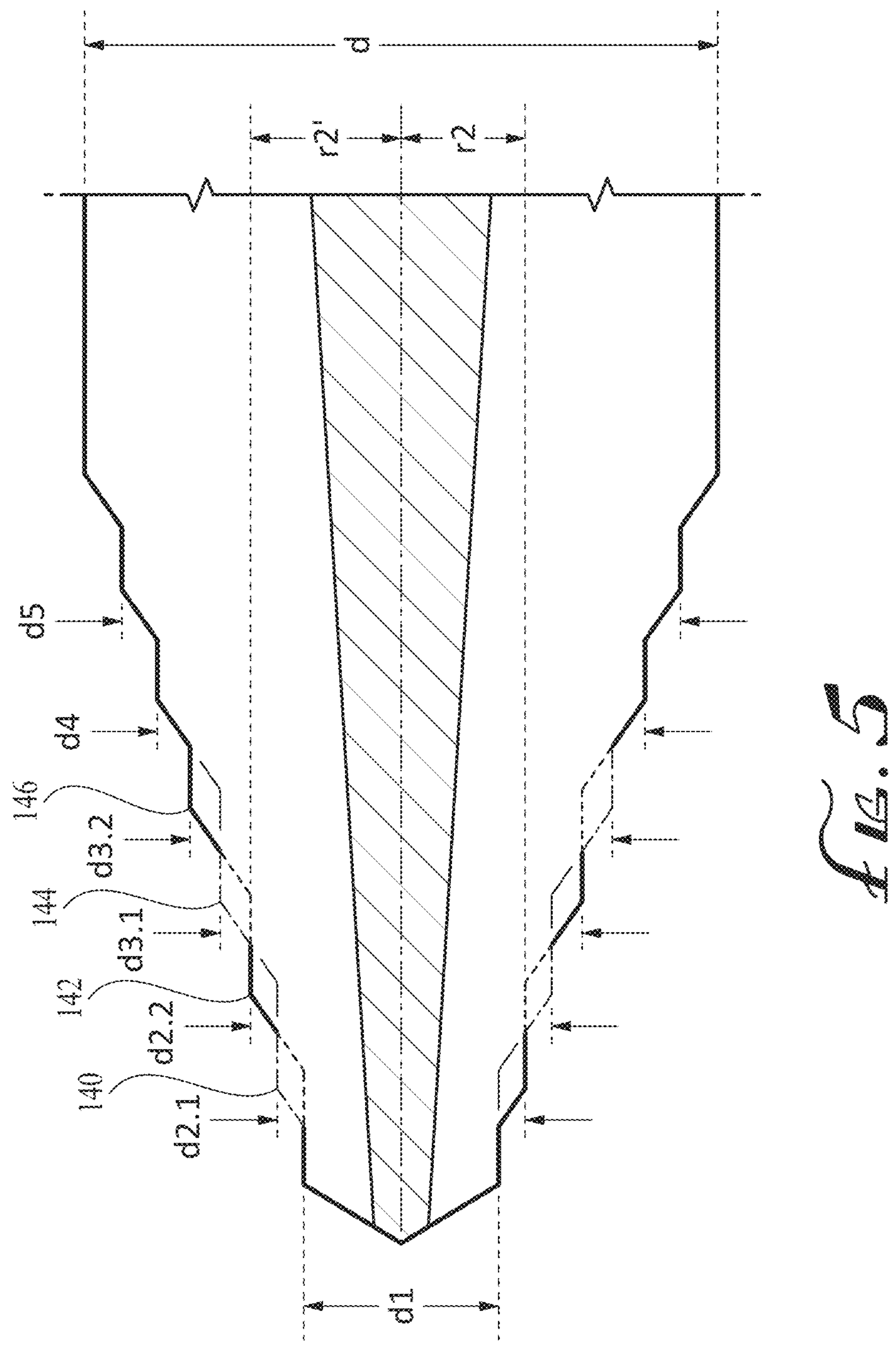
FIG. 5 is a schematic cross-sectional side view of the asymmetric multi-tip drilling part of FIG. 4, whereby composite cutting effect of the asymmetric step segments is illustrated.
Figure 6:
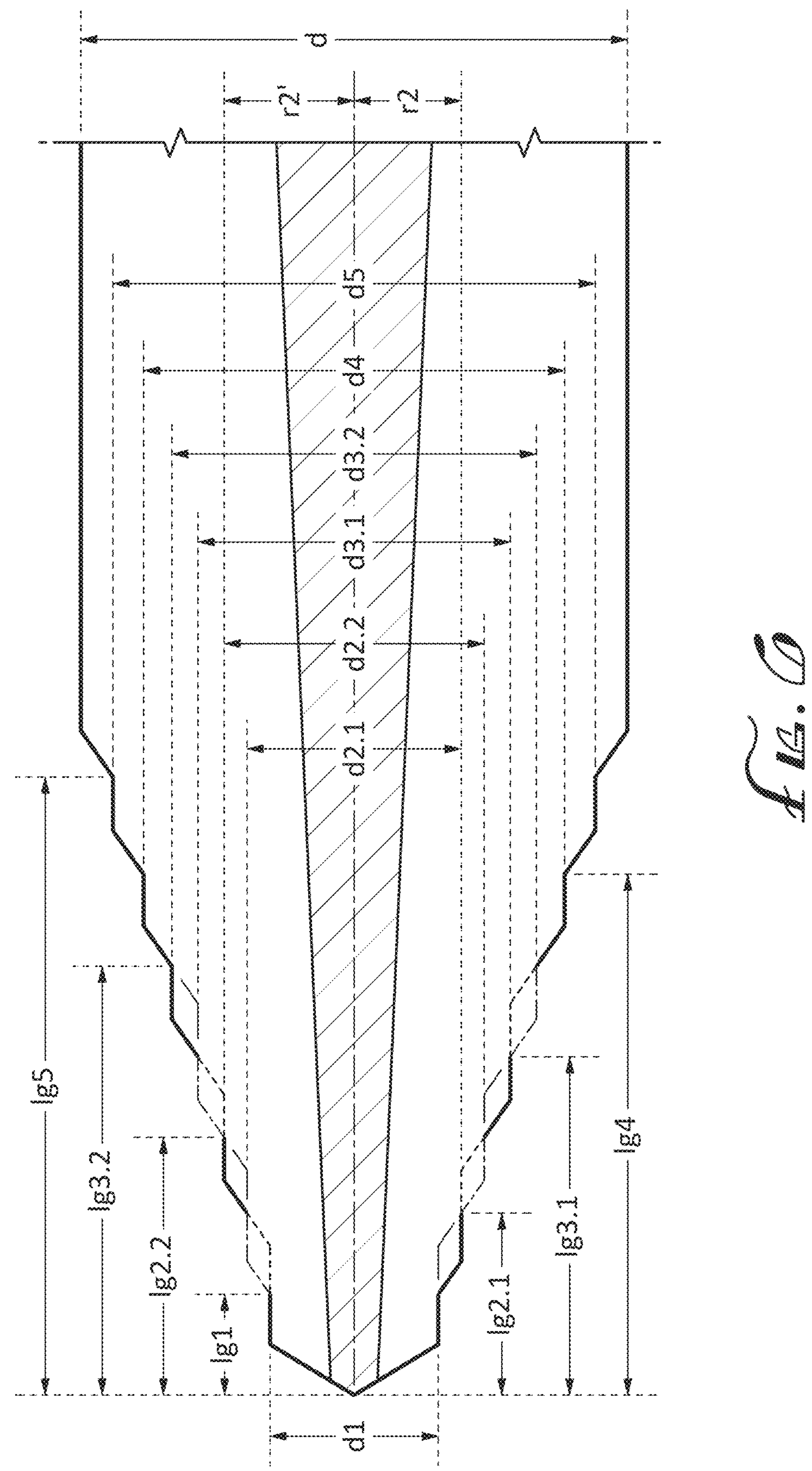
FIG. 6 is a schematic cross-sectional side view of the asymmetric multi-tip drilling part of FIG. 4, whereby composite cutting effect of the asymmetric step segments is further illustrated.

Still referring to FIGS. 1-3 and further referring to FIGS. 4-6, two similar example embodiments of the present drill point arrangement 20 illustrate slightly differing step arrangements, yet both illustrate the present asymmetric design and can be similarly described together. The drill point arrangement 20 is integrally formed on a cutting tool 22, which is a twist drill 30 for several of the example embodiments illustrated herein. The drill point arrangement 20 includes a drill point body 24 extending from the cylindrical guide portion 36 of the twist drill 30 in a generally conical shaped with an acute overall angle $\alpha$ (as measured from the front tip 26 to the base 28 of the drill point body 24). As the twist drill 30 is rotated counterclockwise, as viewed down the axis of rotation 31 when viewed in FIG. 3, it can be seen that the various cutting tips and associated cutting edges sequentially and gradually engage the workpiece as a hole is drilled therein, where for at least a portion of the operation portion 34 each cutting tip is positioned with a differing radial distance and a differing axial distance compared to the diametrically opposed cutting tip arranged substantially 180° away. At the front tip 26 is a first primary cutting edge 72 and a second primary cutting edge 74 (each also referred to herein as a linear shaped major cutting edge). Parallel to the axis of rotation 31 and extending rearwardly from the first primary cutting edges 72 is a first drill tip minor cutting edge 76. And, parallel to the axis of rotation 31 and extending rearwardly from the second primary cutting edges 74 is a second drill tip minor cutting edge 78, where the second drill tip minor cutting edge 78 is longer than the first drill tip minor cutting edge 76 in this example embodiment.

In particular, looking at FIGS. 2 and 3 the first cutting tip 48 is asymmetric to and opposes the second cutting tip 60 and the third cutting tip 82 is asymmetric to and opposes the fourth cutting tip 94. However, the fifth cutting tip 106 is symmetric to and opposing the sixth cutting tip 118 and the seventh cutting tip 132 is symmetric to and opposing the eighth cutting tip 134. Thus, at least one pair of opposing cutting tips pairs are asymmetric (i.e., each having a differing radial distance and/or a differing axial distance) according to the present drill point arrangement 20. Optionally, in addition to one or more asymmetric pairs, one or more pairs of opposing cutting tips can be symmetric.

Although an ordinal numbering system is indicated herein (i.e., first cutting tip, second cutting tip, . . . nth cutting tip, etc.) this is merely to distinguish one cutting tip from the next (or other numbered part, such as steps, major and minor cutting edges, etc.), and does not necessarily indicate the order of the cutting tips (i.e., as axially ordered starting from the drill tip point or other indicated location). Instead, the positions of the cutting tips and their associated parts are indicated relative to one another, relative to the longitudinal axis or axis of rotation (the radial distance), and relative to the drill tip point (the axial distance).

For example, a second cutting tip positioned next in cutting tip sequence to the first cutting tip indicates that, as the drill rotates and is driven into the workpiece, the first cutting tip contacts and cuts the material of the workpiece just before the second cutting tip contacts and cuts the material of the workpiece (whether the hole is being newly started and enlarged at surface of the workpiece or enlarged within the hole), with no intervening cutting tip(s) that contacts and cuts the material of the workpiece. Once both the first and second cutting tips are within the hole, although they cut the material simultaneously, initial enlargement and deepening of the hole is first achieved by the first cutting tip (and associated cutting edges) and then by the second cutting tip. Since the second cutting tip has an axial distance and a radial distance both greater than those of the first cutting tip, the second cutting tip (and associated cutting edges) cuts the material after the first cutting tip and enlarges the hole relative to the hole machined by the first cutting tip.

In another example, when discussing that the first cutting edge (or tip, etc.) and the second cutting edge (or tip, etc.) having a synchronous cutting sequence (rather than the asynchronous arrangement described above), this indicates that the edges (or alternatively tips or the like when indicated) engage to cut the material at the same time, at the same axial distance, and at the same radial distance.

In yet another example, when discussing that the third cutting tip is positioned subsequent in cutting tip sequence to the second cutting tip, this indicates that the second cutting tip contacts and cuts the material of the workpiece merely before the third cutting tip contacts and cuts the material of the workpiece (whether the hole is being newly started and enlarged at surface of the workpiece or enlarged within the hole), with no intervening cutting tip(s) or with intervening cutting tip(s) that contacts and cuts the material of the workpiece.

Comparing the third cutting tip 82 and the fourth cutting tip 94, it can be seen that this asymmetric pair have a differing radial distance and a differing axial distance. The fourth axial distance Li is greater than the third axial distance Li', each being measured parallel with the axis of rotation 31 from the front tip 26 to each respective cutting tip 82 and 94. And, the fourth radial distance ri is greater than the third radial distance ri', each being measured perpendicular (in the radial direction) to the axis of rotation 31, from the axis of rotation 31 to each respective cutting tip 82 and 94. With this asymmetrical arrangement, the third cutting tip 82 engages and cuts the workpiece (not shown) immediately prior in cutting tip sequence to the fourth cutting tip 94 engaging and cutting the workpiece. Further, the fourth cutting tip 94 (along with the associated fourth major cutting edge 100 and fourth minor cutting edge 102) enlarge the diameter of the hole to the intermediate diameter di, which is equal to the sum of the third radial distance ri' and the fourth radial distance ri.

In a similar manner to comparing the axial and radial measurements of the third cutting tip 82 and the fourth cutting tip 94, the remaining cutting tips can be compared. In this example embodiment, a first axial distance and a first radial distance of the first cutting tip 48 are both less than a second axial distance and a second radial distance of the second cutting tip 60, which is next in cutting sequence (i.e., with no intervening cutting tips) to and opposing the first cutting tip 48. The axial distance asymmetry between the first cutting tip 48 and the second cutting tip is due at least in part to the second drill tip minor cutting edge 78 being longer than the first drill tip minor cutting edge 76.

Looking at the structure of the present drill point arrangement of FIGS. 1-3, the first step 46 is formed on the first land 42 and is defined by cutting or otherwise forming a first transverse step segment or first truncated cone segment 50 adjoining a first parallel step segment or cylindrical segment 52, defining the first major cutting edge 54 and the first minor cutting edge 56 at the first flute 38. The first cutting tip 48 is defined by the intersection of the first flute 38, the first major cutting edge 54, and the first minor cutting edge 56.

The second step 58 is formed on the second land 44 and is defined by cutting or otherwise forming a second transverse step segment or second truncated cone segment 62 adjoining a second parallel step segment or cylindrical segment 64, defining the second major cutting edge 66 and the second minor cutting edge 68 at the second flute 40. The second cutting tip 60 is defined by the intersection of the second flute 40, the second major cutting edge 66, and the second minor cutting edge 68.

The third step 80 is formed on the first land 42 and is defined by cutting or otherwise forming a third transverse step segment or third truncated cone segment 84 adjoining a third parallel step segment or cylindrical segment 86, defining the third major cutting edge 88 and the third minor cutting edge 90 at the first flute 38. The third cutting tip 82 is defined by the intersection of the first flute 38, the third major cutting edge 88, and the third minor cutting edge 90.

The fourth step 92 is formed on the second land 44 and is defined by cutting or otherwise forming a fourth transverse step segment or fourth truncated cone segment 96 adjoining a fourth parallel step segment or cylindrical segment 98, defining the fourth major cutting edge 100 and the fourth minor cutting edge 102 at the second flute 40. The fourth cutting tip 94 is defined by the intersection of the second flute 40, the fourth major cutting edge 100, and the fourth minor cutting edge 102.

The fifth step 104 is formed on the first land 42 and is defined by cutting or otherwise forming a fifth transverse step segment or fifth truncated cone segment 108 adjoining a fifth parallel step segment or cylindrical segment 110, defining the fifth major cutting edge 112 and the fifth minor cutting edge 114 at the first flute 38. The fifth cutting tip 106 is defined by the intersection of the first flute 38, the fifth major cutting edge 112, and the fifth minor cutting edge 114.

The sixth step 116 is formed on the second land 44 and is defined by cutting or otherwise forming a sixth transverse step segment or sixth truncated cone segment 120 adjoining a sixth parallel step segment or cylindrical segment 122, defining the sixth major cutting edge 124 and the sixth minor cutting edge 126 at the second flute 40. The sixth cutting tip 116 is defined by the intersection of the second flute 40, the sixth major cutting edge 124, and the sixth minor cutting edge 126.

The drilling part 20 comprises a plurality of step segments Tn (n=1, 2, 3, . . . , i, . . . ) with increasing diameters against a feeding direction, and each step segment Tn comprises a truncated cone segment 39 and a cylindrical segment 37 adjacent thereafter, as described above. Depending on the embodiment, different numbers of step segments Tn (for example, two, three, four, five, six, seven, eight, nine, ten . . . etc.) can be included. A step groove 43 with a roughly V-shaped cross section extending in a circumferential direction is formed between every two adjacent step segments Tn−1 and Tn, and each step groove 43 is defined by a cylindrical segment 37 of the previous step segment Tn−1 and a truncated cone segment 39 of the next step segment Tn. In another embodiment, a rear cylindrical segment 37 can also be replaced by a truncated cone segment 39 with a smaller cone angle than the truncated cone segment 39. Each chip-discharging flute 38 and 40 intersects with the truncated cone-shaped segment 39 surface of each step segment Tn to form a major cutting edge 45, and intersects with the cylindrical segment 37 surface of each step segment Tn to form a minor cutting edge 47. Both the major cutting edge 45 and the minor cutting edge 47 of the same step segment Tn formed by intersecting with the same chip-discharging flute, further intersect to form a cutting-edge tip 49. Therefore, a plurality of step segments Tn form a plurality of cutting-edge tips 49. A plurality of cutting-edge tips 49 formed by the same chip-discharging flute and different step segments Tn are distributed on a tapered spiral line extending about the working rotational axis 31 of the drilling part 20. Therefore, the drilling part 20 is called a multi-tip (formed by a plurality of step segments Tn) drilling part 20. The two chip-discharging flutes 38, and 40 each form a pair of major cutting edge 45 and minor cutting edge 47 with the same step segment Tn, and each pair of major cutting edge 45 and minor cutting edge 47 forms a cutting-edge tip 49, so that two cutting-edge tips 49 distributed in the circumferential direction are formed on the same step segment Tn.

As for the major cutting edge 45, referring to the embodiment shown in FIGS. 1-3, the major cutting edge 45 on each step segment Tn can be formed to be one-segmental, and this one-segment edge can be linear or arc-shaped. However, in some embodiments not shown, at least one of the major cutting edges 45 can also be formed to be multi-segmental, and each segment can be linear or arc-shaped. The multi-segmental major cutting edge 45 comprises at least two major cutting edge segments, and an angle (not of 0 and 180°) can be formed between two adjacent major cutting edge segments. Therefore, the chip can be further decomposed, reducing the chip cutting force and cutting heat.

In this embodiment, the first step segment T1 at the foremost end of the drilling part 20 constitutes a drill tip segment T1 with the smallest diameter of the twist drill, the two major cutting edges 45 of the drill tip segment are formed as two linear-shape or straight-line-shape major cutting edges 45, where an obtuse included angle formed between the two major cutting edges 45 can correspond to an included angle of the major cutting edges of a common non-multi-step-segment twist drill, and is larger than a cone angle α of the entire conical drilling part 20, where the cone angle α is preferably formed as an acute angle, but it can also be optionally formed as a right angle or an obtuse angle. In such a structure, the small-diameter drill tip segment serving as the first step segment T1 has a good centering, and the cylindrical segment 37 of the drill tip segment becomes a centering shaft after cutting into a processed object. When, especially, the asymmetric cutting edges with an offset structure, which will be further described in detail below, of the subsequent step segment Tn (where n>1) gradually cut into the processed object, the cylindrical segment 37 of the drill tip step is sufficient to play a centering role, so that the working rotational axis 10 will not deviate. Like a conventional twist drill, two linear-shape major cutting edges 45, two additional auxiliary edges and a cross edge 25 on the drill tip segment form top edges on the drill tip segment. The two linear-shape major cutting edges 45 intersect at both ends of the cross edge 25 at the front end, so that the cross edge 25 is located at the foremost end of the drill tip segment.

Here, the point at the foremost end of the drill bit in the feeding direction or in the direction of the working rotational axis is formed as the drill tip point 70, which is also the point at the foremost end or farthest end of the drill tip segment of the first step segment T1. At the beginning of drilling, the drill tip point 70 is the part of the drill bit firstly contacting a workpiece. Conceivably, the drill tip point 70 can be located on the cross edge 25, and it can be the intersection point of the working rotational axis 31 and the cross edge 25. If the cross edge 25 is a straight edge perpendicular to the working rotational axis 31, then, any point on the cross edge 25 can be called the drill tip point 70.

The drilling part 20 also includes a transition segment 128, 130 that transitions from the last step segment (or rather its cylindrical segment) to an adjacent portion of the hole processing tool 22 where it is, here, the guide portion 36. The transition segment 128, 130 is formed as a truncated cone segment 39 that connects the cylindrical segment 37 of the last one step segment with the guide portion 36. This transition segment 128, 130 also forms major cutting edges 45 with the chip-discharging flutes 38, 40.

In the present invention, the substantially conical drilling part 20 is divided into a plurality of substantially arc-shaped sides by a plurality of chip-discharging flutes 38, 40 in the circumferential direction, so that each side is defined by two adjacent chip-discharging flutes 38, 40 in the circumferential direction. Each side of the drilling part 20 comprises a plurality of step segment portions (or step segmental parts) with increasing diameters against a feeding direction, and each step segment portion comprises correspondingly a truncated cone segment portion 39 and a cylindrical segment portion 37 adjacent thereafter. Besides, each side of the drilling part 20 also includes a transition segment portion 128, 130 located last in the feeding direction, so that each transition segment portion 128, 130 is also defined by two adjacent chip-discharging flutes 38, 40 in the circumferential direction.

In order to facilitate the description and understanding of the present invention, it is defined here that all the step segment portions of the same serial number on each side are still defined as forming a step segment Tn (n=1, 2, 3, . . . , i, . . . , 9) in condition that step segment portions of each side are sequentially numbered against the feeding direction. For example, taking the embodiment shown in FIGS. 1-3 as an example, the drilling part 20 is divided into two substantially arc-shaped sides by two chip-discharging flutes 38, 40 in the circumferential direction, so that each side is defined by two chip-discharging flutes 38, 40 in the circumferential direction. Each side of the drilling part 20 comprises a plurality of step segment portions with increasing diameters against the feeding direction, and each step segment portion comprises correspondingly a truncated cone segment portion 39 and a cylindrical segment portion 37 adjacent thereafter. The step segment portions of the two sides are numbered 1, 2, 3, . . . , i in sequence against the feeding direction, and the two step segment portions with the same serial number i of the two sides are defined as forming one step segment Ti (i=1, 2, 3, . . . , 9). It is not concerned with whether the two step segment portions with the same serial number i are rotationally symmetrical to each other about the working rotational axis. Besides, each side of the drilling part 20 also includes a transition segment portion 128, 130 located last in the feeding direction, so that each transition segment portion 128, 130 is defined by two adjacent chip-discharging flutes 38, 40 in the circumferential direction.

The two step segment portions (can also referred to as step segmental halves here), spaced by the two chip-discharging flutes 38, 40, of the same step segment Ti (here indicated schematically as the third step section T3) of the drilling part 20 are not symmetrical about the working rotational axis 31 of the drilling part 20.

In particular, the radius ri of the cylindrical segment 37 of the step segment portion on the first side, of the asymmetric step segment Ti is larger than the radius ri' of the cylindrical segment 37 of the step segment portion on the second side, of the step segment Ti, that is, ri>ri', and the axial length Li of the cylindrical segment 37 (or its front end) of the step segment portion on the first side, of the step segment Ti, from the 15 is greater than the axial length Li' of the cylindrical segment 37 (or its front end) of the step segment portion on the second side, of the step segment Ti, from the drilling tip point 70, that is, Li>Li'. That is, the step segment portion with a smaller radius in the same step segment is disposed closer to the drill tip point 70 in the axial direction.

In other words, the two cutting-edge tips 49 formed by the same step segment Ti with the two chip-discharging flutes 38, 40 are not symmetrical about the working rotational axis 31 of the drilling part 20. In particular, the radius ri of the cutting-edge tip 49 of the step segment portion on the first side, of the step segment Ti is larger than the radius ri' of the cutting-edge tip 49 of the step segment portion on the second side, of the step segment Ti, that is, ri>ri', and the axial length Li of the cutting-edge tip 49 of the step segment portion on the first side, of the step segment Ti, from the drilling tip point 70 is greater than the axial length Li' of the cutting-edge tip 9 of the step segment portion on the second side, of the step segment Ti, from the drilling tip point 70, that is, Li>Li'.

Therefore, on one hand, the two radii ri, ri' (here, i=3) measured at the two cutting-edge tips 49 of the same step segment Ti of the drilling part 20 are not equal and are not equated to half the diameter di' of the step segment Ti, that is, ri≠ri'≠di'÷2, but ri+ri'=di'. Here, the radii ri, ri of the cutting-edge tips 49 can be understood as a distance between the cutting-edge tips 49 and the working rotational axis 31 of the drilling part 20. On the other hand, axial lengths Li, Li' of the two cutting-edge tips 49 on the same step segment Ti from the drill tip point 49 are also not equal, that is, Li≠Li'.

This results in that the two major cutting edges 45 of the asymmetric step segment Ti distributed at 180° in the circumferential direction on the two chip-discharging flutes 38,40 do not participate in the cutting at the same time when cutting the same workpiece section, that is, they cut successively or in a offset manner in the axial direction. The major cutting edge 45 closer to the drill tip point 49 cuts first, and thereafter, another major cutting edge 45 distributed at 180° in the circumferential direction (that is, the major cutting edge 45 relatively far away from the drill tip point 49) cut, whereby the metal remaining amount is gradually decomposed until a hole with a required diameter is obtained. Therefore, when drilling a hole, the drill bit with this asymmetric multi-tip drilling part 20 has a reasonable distribution of cut metal remaining amount according to the diameter of the hole, and the amount of metal removed is gradually decomposed and cut, thus avoiding the shortcomings of the symmetric multi-tip drilling part of existing drill bits, thereby enabling a smoother processing process. At the same time, drilling is more efficient and labor-saving. In addition, due to existence of the asymmetric step segment Ti, cutting force is not strictly, symmetrically distributed at 180° on the circumference, so that it will not produce cutting resonance with the same frequency and period.

Although an asymmetrical structure of the cutting edges on particular step segments of the drilling part 20 are illustrated, such an asymmetrical structure of cutting edges may also be arranged on other or more step segments. That is, such an asymmetric cutting edge structure can be provided on at least one step segment Tn of the drilling part 20.

Here, in each step segment Tn (n>1) of the drilling part 20 after the drill tip segment T1 in the feeding direction, the length of the major cutting edges on the step segment with a small diameter may be shorter than that on the step segment with a large diameter, but this is not mandatory, and considerably, the former may be longer than the latter or they may be equal in practice.

Next, referring to FIG. 2 to FIG. 6, a specific application of the design concept of the present invention will be further described in detail, taking the drilling part 20 with five step segments Tn as an example.

In existing designs, the radii of the cylindrical segments 37 or the cutting-edge tips 49 of two step segment portions of the same step segment Ti of the symmetrical multi-tip drilling part 20 are the same, and are equal to half of the corresponding measured/working diameter di, that is, ri=ri=di÷2. In the present design, the measured radii ri, ri' of the cylindrical segments 37 or cutting-edge tips 49 of the two step segment portions of the same step segment Ti (here, i=2, 3) of the asymmetric multi-tip drilling section 4 according to the present invention are different, and the measured diameter dic of the step segment Ti is equal to the sum of the two radii ri, ri' of the cylindrical segments 6 or cutting-edge tips 9 of the two step segment portions, that is, dic=ri+ri', wherein, the measured diameter d2c of the second step segment T2, which is exemplarily illustrated, as can be seen in FIG. 4, is equal to the sum of the two measured radii r2 and r2'. However, the actual working diameter dig of the step segment Ti (that is, the maximum diameter that the step segment Ti can cut) is equal to twice its maximum radius max {ri, ri'}, that is, dig=2*max {ri, ri'}.

In existing designs, the axial lengths of the cylindrical segments or the cutting-edge tips of two step segment portions of the same step segment Ti of the symmetrical multi-tip drilling part from the drill tip point are the same, that is, Li=Li'. In this embodiment according to the present invention, referring to FIG. 2, the axial lengths of the cylindrical segments 37 or the cutting-edge tips 49 of two step segment portions of the same step segment Ti (here, i=2, 3) of the asymmetrical multi-tip drilling part 20 of the present invention from the drill tip point 70 are not equal, that is, Li≠Li', but there is a misalignment ΔLi in the axial direction, ΔLi=Li−Li'. As exemplarily shown in FIG. 4, ΔL1=L1'−L1.

In this embodiment, only the second step segment T2 and the third step segment T3 are axially and radially offset, that is, asymmetrically arranged with respect to the working rotational axis 31, while the first step segment T1 serving as the drill tip segment, the subsequent fourth step section T4 and fifth step section T5 are still symmetrically arranged with respect to the working rotational axis 31. Therefore, the measured diameters d1, d4 and d5 of the first, fourth and fifth step segments T1, T4 and T5 are equal to their working diameters, while the measured diameters d2 and d3 of the second and third step segments T2 and T3 are not equal to their working diameters, but smaller than their working diameters dig (dig=2*max {ri, ri'}, where i=2, 3). The radii of the cylindrical segments 37 or cutting-edge tips 49 on different step segment portions of each of the two step segments T2, T3 are not equal and the cylindrical segments 37 or cutting-edge tips 49 are axially offset from each other. In operation, these two asymmetric step segments T2, T3 can be advantageously compound (i.e., compound after multi-edge cutting) to form four working steps T2.1, T2.2, T3.1, T3.2, which will be described below in detail with reference to FIG. 5, for example.

Besides, in FIG. 4, there are also illustrated, respective axial lengths l1, l2, l3, l4, l5 of the step segment portions on the first side, of each step segment Tn of the drilling part 20; respective axial lengths l1', l2', l3', l4', l5' of the step segment portions on the second side, of each step segment Tn of the drilling part 20; measured diameter d1<d2<d3<d4<d5 of each step segment Tn; radius differences δ2, δ3, δ4, δ5, δ2', δ3', δ4', δ5' of the cylindrical segments 37 or cutting-edge tips 49 of the same side step segment portions of adjacent step segments Tn, where δ 2<δ 2', δ 5=δ 5'; and radial differences δ, δ' between the cylindrical segment 37 of each step segment portion of the fifth step segment T5 and the guide portion 11, where δ=δ'.

Next, referring to FIGS. 5 and 6, a cross-sectional view of the asymmetric multi-tip drilling part 20 sectioned in a plane parallel to the working rotational axis 10 is shown schematically. It can be seen here that the asymmetric second and third step segments T2, T3 of the drilling part 20 according to the present invention are compound into composite cutting effect of four working step segments: working step segment T2.1 (reference numeral 140), working step segment T2.2 (reference numeral 142), working step segment T3.1 (reference numeral 144), working step segment T3.2 (reference numeral 146) in actual work. Terms "upper" and "lower" used below refer to orientation of structural features in FIGS. 5 and 6.

In particular, for the asymmetrically arranged second step segment T2, the radius r2 of the lower cylindrical segment 37 or cutting-edge tip 49 of the second step segment T2 is smaller than the radius r2' of the upper cylindrical segment 37 or cutting-edge tip 49 of the second step segment T2, and the axial distance from the front end of the lower cylindrical segment 37 or the lower cutting-edge tip 49 of the second step segment T2 to the drill tip point 70 is smaller than that from the front end of the upper cylindrical segment 37 or the upper cutting-edge tip 49 of the second step segment T2 to the drill tip point 70. Therefore, it can be seen that the lower major cutting edge 45 of the second step segment T2 is fully involved in cutting, while the upper major cutting edge 45 of the second step segment T2 is only partially involved in cutting, when it is imaged that the lower cutting edges 45, 47 of the second step segment T2 are rotated 180° upward around the central axis 31 and the upper cutting edges 45, 47 of the second step segment T2 are rotated 180° downward around the central axis 31 (see especially the dark black thick lines of the two front folds in the axial direction). As such, one second step segment T2 itself produces a composite cutting effect of two working step segments T2.1 and T2.2.

Similarly, for the asymmetrically arranged third step segment T3, the radius of the lower cylindrical segment 37 or cutting-edge tip 49 of the third step segment T3 is smaller than the radius of the upper cylindrical segment 37 or cutting-edge tip 49 of the third step segment T3, and the axial distance from the front end of the lower cylindrical segment 37 or the lower cutting-edge tip 49 below the third step segment T3 to the drill tip point 70 is smaller than that from the front end of the upper cylindrical segment 37 or the upper cutting-edge tip 49 of the third step segment T3 to the drill tip point 70. Therefore, it can be seen that the lower major cutting edge 45 of the third step segment T3 is fully involved in cutting, while the upper major cutting edge 45 of the third step segment T2 is only partially involved in cutting, when it is imaged that the lower cutting edges 45, 47 of the third step segment T3 are rotated 180° upward around the central axis 31 and the upper cutting edges 45, 47 of the third step segment T3 are rotated 180° downward around the central axis 31 (see especially the dark black thick lines of the two front folds in the axial direction). As such, one third step segment T3 itself produces a composite cutting effect of two working step segments T3.1 and T3.2.

Thus, as can be seen from FIGS. 5 and 6, this drilling part 20 with five step segments Tn can be decomposed or combined into seven step segments Tn to participate in cutting in actual work, so that there are two additional working step segments Tn compared with the symmetrical drilling part 20 with five step segments Tn. The four working step segments T2.1, T2.2, T3.1, T3.2, which are formed by combining the asymmetric second step segment T2 and the asymmetric third step segment T3, are also asymmetric in measured dimensions, and their working diameters d2.1, d2.2, d3.1, d3.2 are different from the measured diameters. Their working diameters d2.1, d2.2, d3.1, d3.2 are twice the maximum (ri or ri') of the two radii at the working step segments T2.1, T2.2, T3.1, T3.2 respectively, that is, 2×max {ri, ri'}. For this, one may refer to the annotation of the third working step segment T2.2 in FIGS. 5 and 6. Its measured diameter is the sum of r2 and r2', but it is smaller than its working diameter d2.2=2×r2'.

In this embodiment, the measured diameter d1 of the symmetrical first step segment T1, the measured diameter d4 of the symmetrical fourth step segment T4 and the measured diameter d5 of the symmetrical fifth step segment T5 are their actual working diameters.

As can be seen from FIGS. 5 and 6, the working diameters d1, d2.1, d2.2, d3.1, d3.2, d4, d5 of the seven working step segments Tn are increasing and smaller than the diameter d of the adjacent portion of the hole processing tool, here, the cylindrical guide portion 36. The axial distances lg1, lg2.1, lg2.2, lg3.1, lg3.2, lg4 and lg5 from the rear end of the cylindrical segment 37 of the seven working step segments Tn to the drill tip point 70 are increasing.

As can be seen from FIGS. 5 and 6, the cutting-edge tips 49 of the second step segment T1 and the fourth and fifth step segments T4 and T5 are symmetrically distributed about the working rotational axis 31, that is, the cutting-edge tips 49 on the same step segments T4, T5 not only have the same radius, but also have the same axial distance to the drill tip point 70 or are not axially offset.

In such an overall structure, firstly, the small-diameter drill tip segment serving as the first step segment T1 has good centering property, and the drill tip segment becomes a centering shaft after cutting into the machined object or workpiece. Besides, the radial distance (cutting radius) between the cutting edges of the second, third step segments T2, T3 and the rotational axis 31 is small, that is, a cantilever amount is small, so that a force borne is also small, whereby their asymmetric structures will not generate a large eccentric force on the drilling part 20. Therefore, when the asymmetrical cutting edges with an offset structure of the subsequent second and third step segments T2 and T3 gradually cut into the machined object, the first step segment T1 is sufficient to play a centering role, so that the working rotational axis 31 does not deviate. On the other hand, the radial distance (cutting radius) between the cutting edges of the fourth and fifth stage segments T4 and T5 and the axis is large, that is, a cantilever amount is large, so that a force borne is large. Therefore, the cutting edges (or cutting-edge tips 49) are designed to be symmetrically distributed, so that the major cutting edges 45 bearing a large cutting force can be balanced during radial cutting, so that the cutting of the whole drilling part 20 can be balanced, and the working rotational axis 31 during drilling is stabilized and deviation of the working rotational axis 31 is avoided, and diametrical accuracy of the final hole is ensured. Besides, after the whole drilling part 20 is completely cut into the machined object, the cutting edges of all step segments Tn work simultaneously, since the entire cutting force is not strictly, symmetrically distributed at 180° on the circumference, it will not produce cutting resonance with the same frequency and period.

Besides, since the cutting edges of the asymmetric step segments T2, T3 of the asymmetric multi-tip drilling part 20 are offset in the axial direction, the metal remaining amount to be cut off will be decomposed and refined again in the actual cutting work. In this embodiment, each of the five step segments Tn has two step segment portions, and when they both enter the work (rotation), the effect of machined (cut) seven step holes is achieved, such that the actual number of cutting edges (seven steps) of the tool in working (cutting) is greater than that (five steps) of the tool itself.

Referring to FIG. 6, due to the axial offset structure of the asymmetric step segments T2, T3, the axial distances between adjacent major and minor cutting edge pairs on the same chip-discharging flute 38, 40 and the drill tip point 70 have a distance difference Δl2=lg3.1−lg2.1 (that is, the distance difference between the major and minor cutting edge pairs on the second working step segment T2.1 and the fourth working step segment T3.1), Δl3=lg3.2−lg2.2 (that is, the distance difference between the major and minor cutting edge pairs on the third working step segment T2.2 and the fifth working step segment T3.2). This difference is much greater than the distance difference Δl2'=lg2.2−lg2.1 and Δl3'=lg3.1−lg2.2 between adjacent major and minor cutting edges on the same chip-discharging flute 3 and the drill tip point 70 in the symmetrically distributed step structure of the symmetrical multi-tip drilling part 20, that is, Δl2=lg3.1−lg2.1 is much greater than ΔL2'=lg2.2−lg2.1, Δl3=lg3.2−lg2.2 is much larger than ΔL3'=lg3.1−lg2.2. This increases a chip discharging space between adjacent cutting edge pairs of the chip-discharging flute 38, 40 on the same side, such that the chip discharge is smoother. Especially, for a cutting edge at a small-diameter step segment Tn, the cutting linear speed is small, and the chip outflow speed is also small, and at the same time, the chip-discharge flute 38, 40 is narrow due to the small diameter, so that the chip discharge of the cutting edge at the small-diameter step segment Tn will be relatively difficult. However, due to the axial offset structure of the asymmetric multi-tip drilling part 20 according to the present invention, the chip discharging space between adjacent cutting edge pairs on the same chip-discharging flute 38, 40 is increased, thereby improving the chip-discharging performance of cutting edges of small diameter steps.

Figure 7:
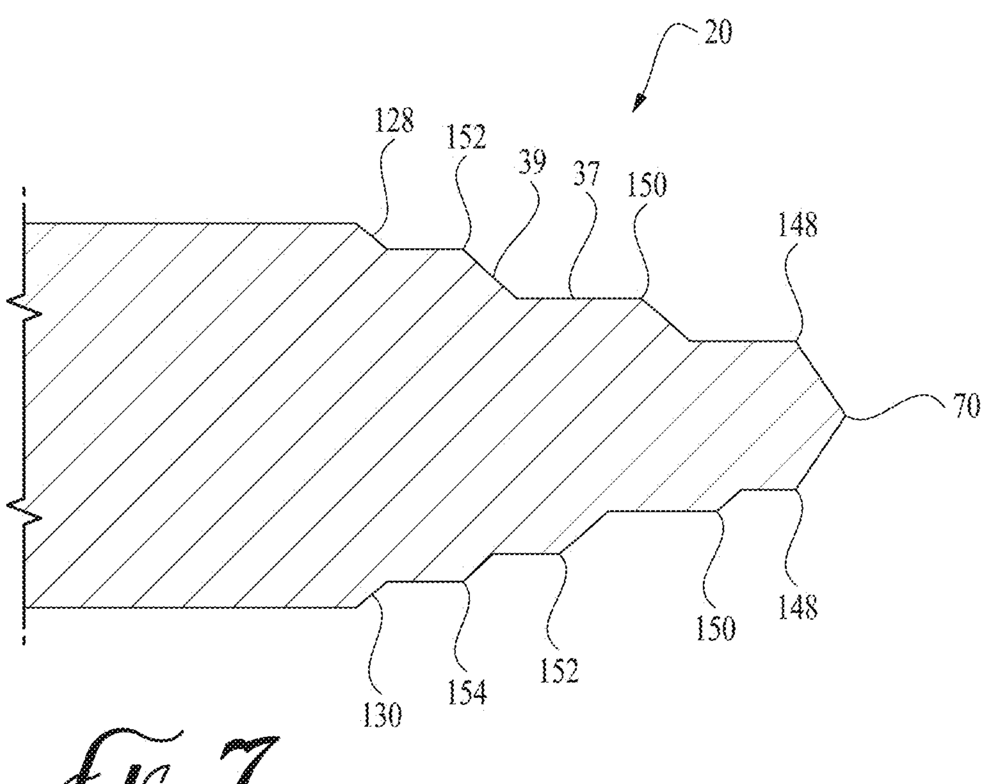
FIG. 7 is a schematic cross-sectional side view of an asymmetric multi-tip drilling part according to yet another example embodiment, integral to a twist drill.
Figure 8:
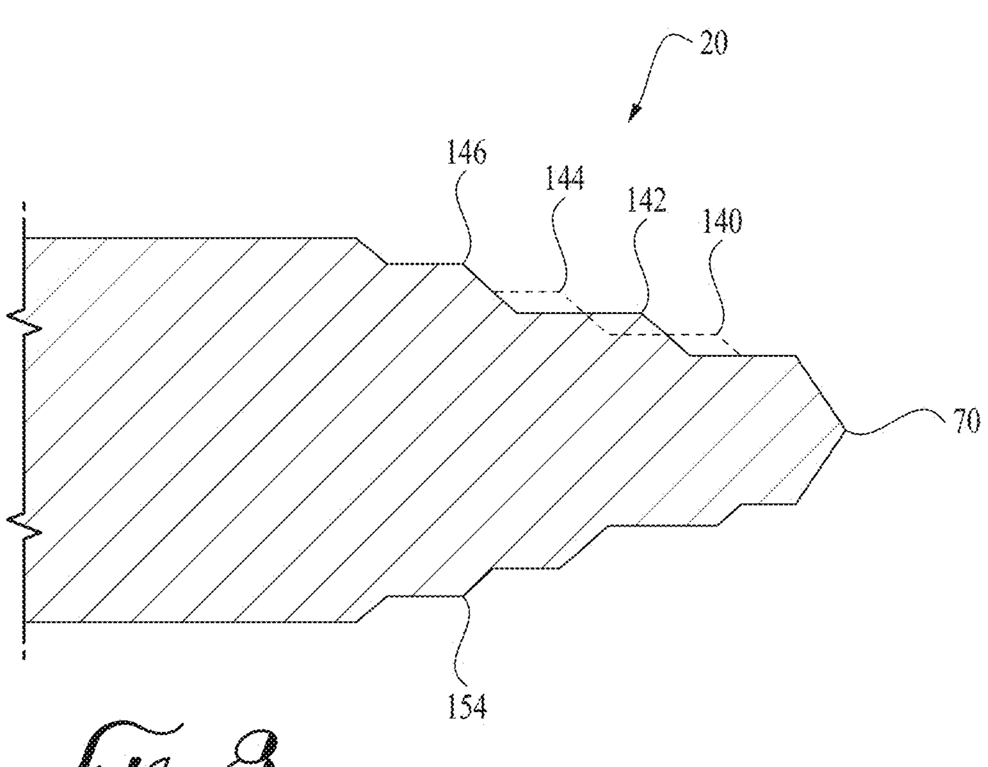
FIG. 8 is a schematic cross-sectional side view of the asymmetric multi-tip drilling part of FIG. 7, whereby composite cutting effect of the asymmetric step segments is illustrated.

Referring to FIGS. 7 and 8, a schematic longitudinal sectional view of an asymmetric multi-tip drilling part 20 according to a further embodiment of the present invention, is shown.

In this embodiment, the drilling part 20 is divided into two sides by two chip-discharging flutes 38, 40 in the circumferential direction. Different from the above-mentioned embodiment, in this embodiment, the upper side of the drilling part 20 includes three step segment portions: step segment portion T1 (reference numeral 148), step segment portion T2 (reference numeral 150), step segment portion T3 (reference numeral 152) having diameters increasing against the feeding direction and a transition section 12, while the lower side of the drilling part 20 includes four step segment portions: step segment portion T1, step segment portion T2, step segment portion T3, step segment portion T4 (reference numeral 154) having diameters increasing against the feeding direction and a transition section 128, 130.

All the step segment portions of the same serial number are still defined as forming a step segment Tn (n=1, 2, 3, 4), which step segment portions on each side are sequentially numbered against the feeding direction. In particular, the first, second and third step segment portions T1, T2 and T3 in the feeding direction on the upper side and the first, second and third step segment portions T1, T2 and T3 in the feeding direction on the lower side respectively form the first, second, third step segments T1, T2 and T3, correspondingly; while the fourth step segment portion T4 on the lower side in the feeding direction itself forms the fourth step segment T4.

Referring to FIGS. 7 and 8, the two step segment portions of the second step segment T2 and the two step segment portions of the third step segment T3 of the drilling part 20 are not symmetrical about the working rotational axis 31.

In particular, the radii (or radial distances from the working rotational axis 31) of the cylindrical segments 37 of the upper side step segment portions of the second step segment T2 and the third step segment T3 are larger than those (or radial distances from the working rotational axis 31) of the cylindrical segments 37 of the lower side step segment portions of the second step segment T2 and the third step segment T3, respectively, and the axial lengths of the cutting-edge tips 49 of the upper step segment portions of the second step segment T2 and the third step segment T3 from the drill tip point 70 are greater than those of the cutting-edge tips 49 of the lower step segment portions of the second step segment T2 and the third step segment T3 from the drill tip point 70, respectively. That is, the step segment portion with a smaller radius in the same step segment is disposed closer to the drill tip point 70 in the axial direction.

FIG. 8 shows the respective composite cutting effect of the asymmetric second step segment T2 and third step segment T3. It can be seen here the composite cutting effect of the asymmetric second and third step segments T2, T3 compounding into four working step segments T2.1 (reference numeral 140), T2.2 (reference numeral 142), T3.1 (reference numeral 144), T3.2 (reference numeral 146) in actual work.

Here, the cutting-edge tip 49 of the working step segment T3.2 is symmetrical with the cutting-edge tip 49 of the lower fourth step segment T4 or the fourth step segment portion T4. Therefore, cooperation between the working step segment T3.2 and the fourth step segment T4 or the fourth step segment portion T4 which are symmetrically arranged can maintain its centering function after the drilling part 20 enters the workpiece.

Figure 9:
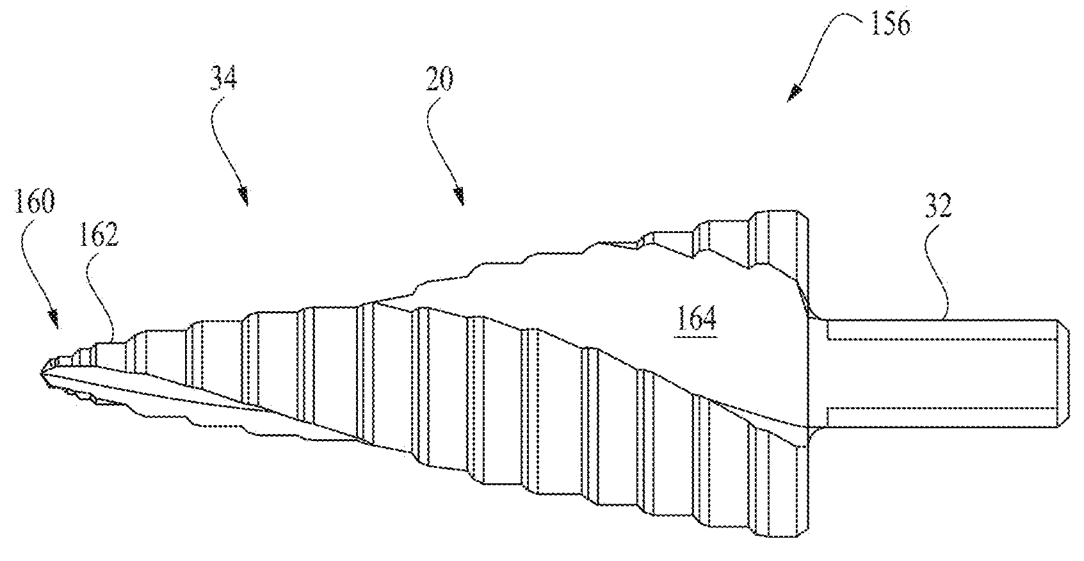
FIG. 9 is a side view of the use of an asymmetric multi-tip drilling part according to one embodiment of the present invention, integral to a step or multidiameter drill bit.

FIG. 9 shows a schematic side view of the use of an asymmetric multi-tip drilling part 20 according to one embodiment of the present invention, in a pagoda drill 156, also known as a step drill bit or multidiameter drill bit. The pagoda drill 156 has a shank portion 32 for fixing the pagoda drill and an operation portion 34 adjacent to the shank portion 32 for hole processing, and the operation portion 34 includes a plurality of stepped drilling/reaming portions 158 which are sequentially arranged in the feeding direction and have increasing diameters, and each drilling/reaming portion 158 can drill/ream a hole with the same diameter as its cylindrical segment on, for example, a thin metal plate such as a steel sheet. Generally, the front first step of the operation portion 34 can be called the drilling portion 160, and the next steps can be called the reaming portion 158. The tip of the operation portion 34, which is arranged far away from the shank portion 32, or the front end of the first drilling portion is formed as an asymmetric multi-tip drilling part 20 according to the present invention. That is, the first drilling portion 160 at the foremost end of the operation portion 34 comprises a drilling part 20 according to the present invention and a cylindrical segment 162 adjacent thereto. The cylindrical segment 162 defines, for example, a hole with the smallest diameter that can be drilled by the pagoda drill.

Further, it can be seen that a spiral chip-discharging flute 164 extends longitudinally over the entire operation portion 34.

Figure 10:
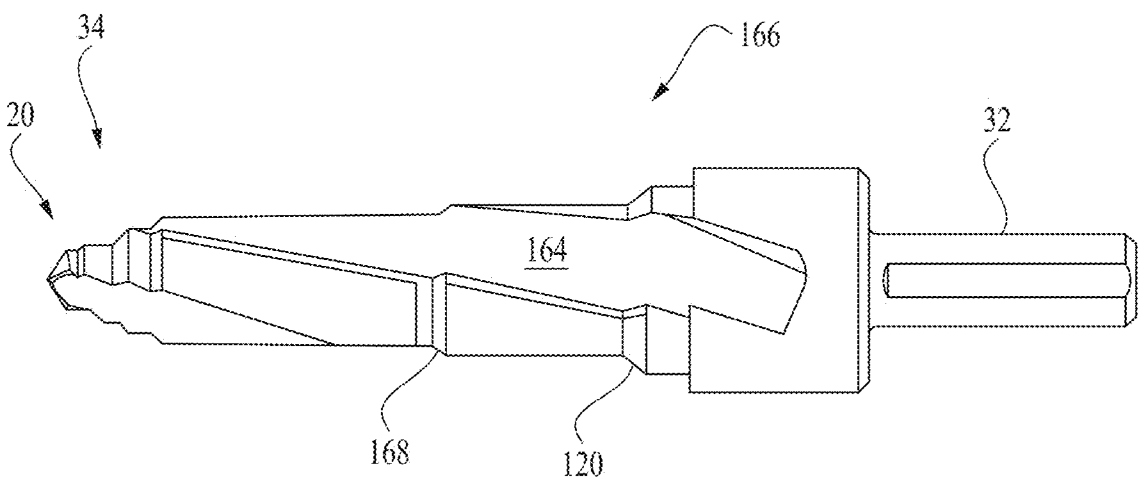
FIG. 10 is a side view of the use of an asymmetric multi-tip drilling part according to one embodiment of the present invention, integral to a chamfering and drilling integrated drill bit.

FIG. 10 shows a schematic side view of the use of an asymmetric multi-tip drilling part 20 according to one embodiment of the present invention, in a chamfering and drilling integrated drill bit 166. The chamfering and drilling integrated drill bit 166 has a shank portion 32 for fixing it and an operation portion 34 adjacent to the shank portion 32 for hole processing. The operation portion 34 comprises, at a foremost end thereof, an asymmetric multi-tip drilling part 20 according to the present invention, a stepped hole drilling portion 168 for drilling a stepped hole after and spaced from the drilling part 20 by an axial distance, and a hole chamfering portion 170 for chamfering the drilled stepped hole after and spaced from the stepped hole drilling portion 168 by an axial distance. Here, the chip-discharging flute 164 successively extends through the multi-tip drilling part 20, the stepped hole drilling portion 168 and the hole chamfering portion 170.

Figure 11:
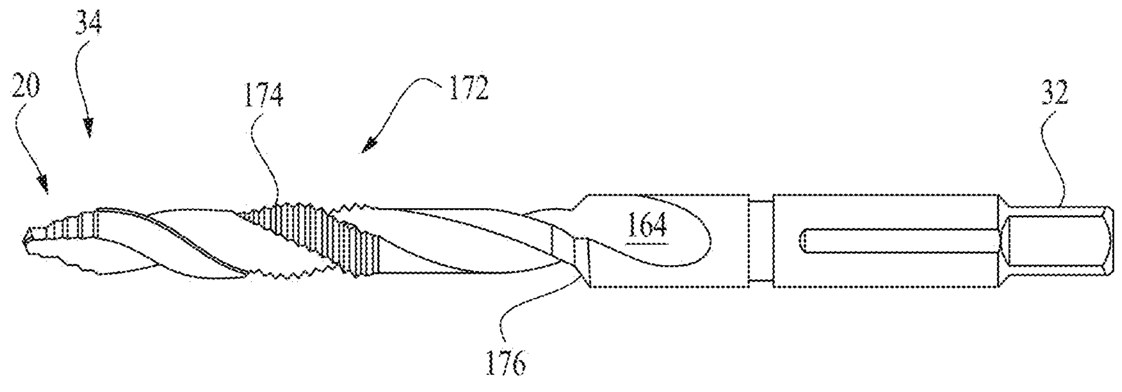
FIG. 11 is a side view of the use of an asymmetric multi-tip drilling part according to one embodiment of the present invention, integral to a composite tap drill bit.

FIG. 11 shows a schematic side view of the use of an asymmetric multi-tip drilling part 20 according to one embodiment of the present invention, in a composite tap drill bit 172. The composite tap drill bit 172 comprises a shank portion 32 for fixing it and an operation portion 34 adjacent to the shank portion 32 for hole processing. The operation portion 34 comprises, at a foremost end thereof, an asymmetric multi-tip drilling part 20 according to the present invention, a tapping portion 174 for tapping a hole after and spaced from the drilling part 20 by an axial distance, and a hole chamfering portion 176 for chamfering the hole after and spaced from the tapping portion 174 by an axial distance. Here, the chip-discharging flute 164 successively extends through the multi-tip drilling part 20, the tapping portion 174 and the hole chamfering portion 176.

Figure 12:
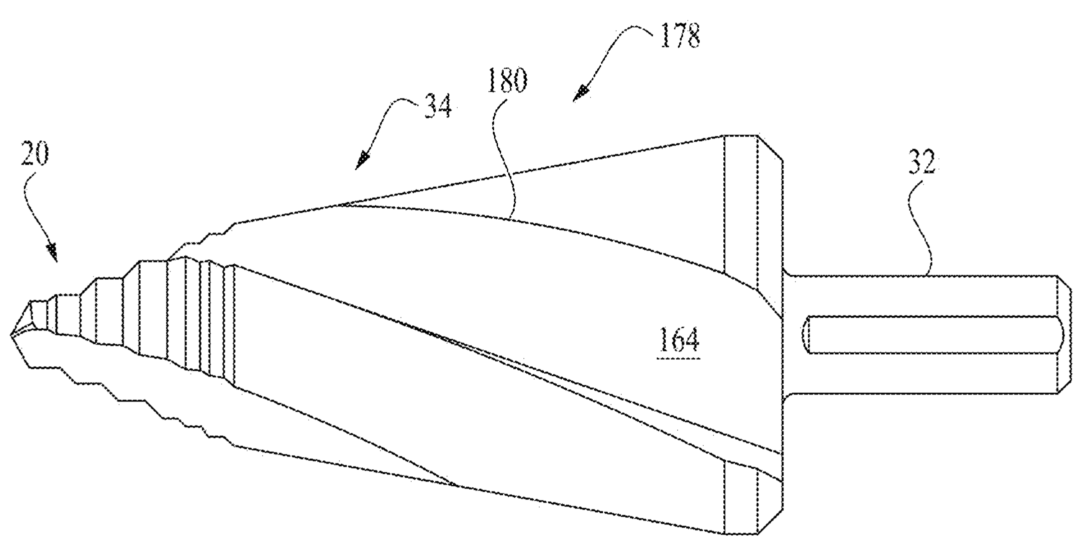
FIG. 12 is a side view of the use of an asymmetric multi-tip drilling part according to one embodiment of the present invention, integral to an any-diameter stepless drill bit.

FIG. 12 shows a schematic side view of the use of an asymmetric multi-tip drilling part 20 according to one embodiment of the present invention, in an umbrella-shaped drill bit 178, also known as an any-diameter stepless drill bit. The umbrella-shaped drill bit 178 comprises a shank portion 32 for fixing an umbrella-shaped drill bit and an operation portion 34 adjacent to the shank portion 32 for hole processing. The operation portion 34 comprises, at a foremost end thereof, an asymmetric multi-tip drilling part 20 according to the present invention and a reaming portion 180 after and immediately adjacent the drilling part 20 wherein the reaming portion 180 configured to ream a hole to a required diameter, is used for processing a thin plate. Based on the asymmetric multi-tip drilling part 20 of the present invention, the umbrella drill bit 178 can efficiently cut into a workpiece and finally complete drilling of a hole. Here, the chip-discharging flute 164 successively extends through the multi-tip drilling part 20 and the reaming portion 180.

Figure 13:
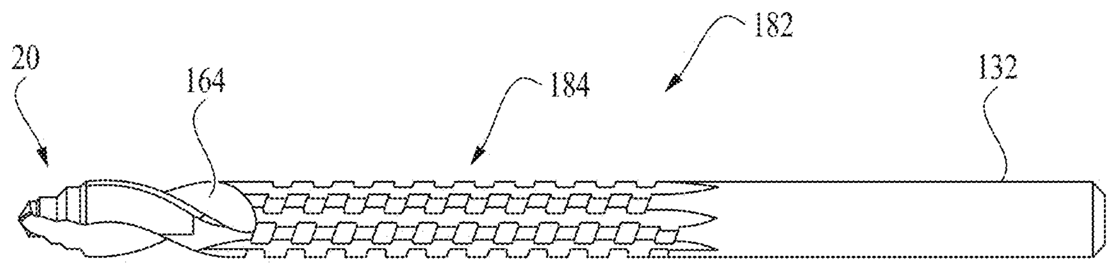
FIG. 13 is a side view of the use of an asymmetric multi-tip drilling part according to one embodiment of the present invention, integral to a side-cutting or saw drill bit.

FIG. 13 shows a schematic side view of the use of an asymmetric multi-tip drilling part 20 according to one embodiment of the present invention, in a saw drill bit 182. The saw drill bit 182 comprises a shank portion 32 for fixing it and an operation portion 34 adjacent the shank portion 32 for hole processing. The operation portion 34 comprises, at a foremost end thereof, an asymmetric multi-tip drilling part 20 according to the present invention and a serrated operation portion 184 after and spaced from the drilling part 20 by an axial distance. The serrated operation portion 184 is configured for cutting in a transverse direction, so as to cut out a required shape on a thin plate.

Figure 14:
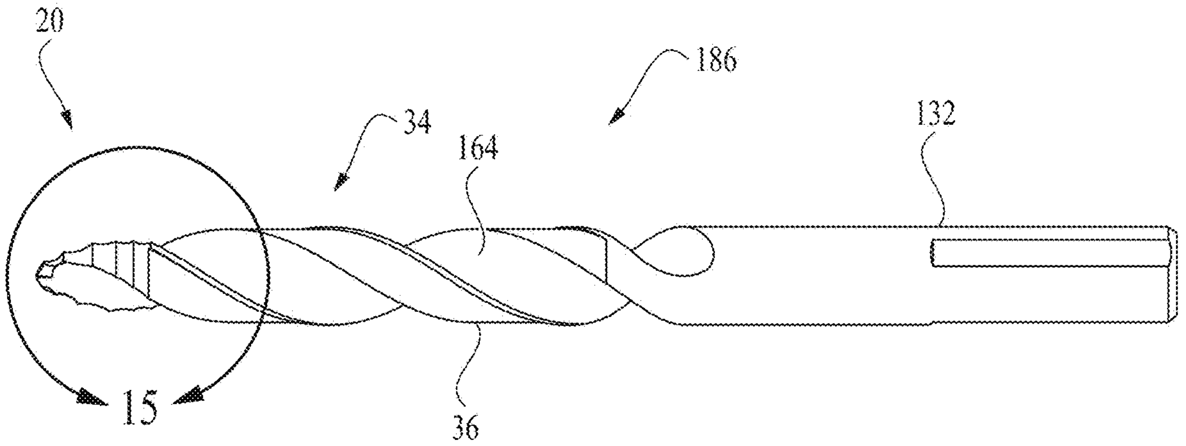
FIG. 14 is a side view of the use of an asymmetric multi-tip drilling part according to yet another embodiment of the present invention, integral to a twist drill.

FIG. 14 shows a schematic side view of the use of an asymmetric multi-tip drilling part 20 according to another embodiment of the present invention, in a twist drill 186. The twist drill 186 comprises a shank portion 32 for fixing the twist drill and an operation portion 34 adjacent the shank portion 32 for hole processing. The operation portion 34 comprises a guide portion 36 adjacent to the shank portion 32, and an asymmetric multi-point drilling part 20 according to an embodiment of the present invention adjacent the guide portion 36 in front of the guide portion 36. Wherein, the chip-discharging flute 164 extends over at least part of the operation portion 34.

Figure 15:
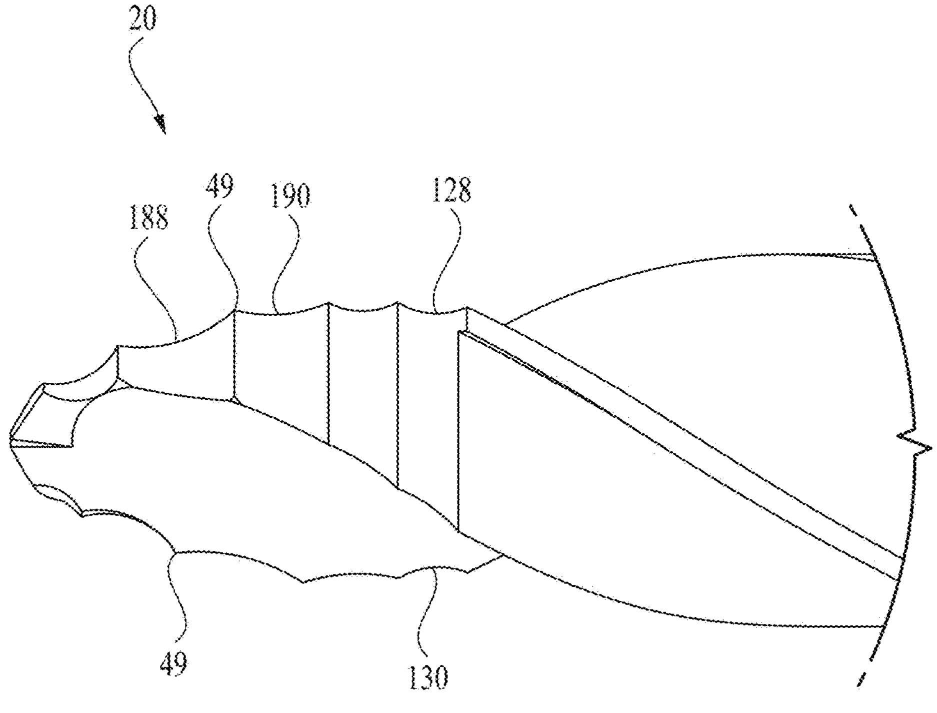
FIG. 15 is a magnified side view of the asymmetric multi-tip drilling part of the twist drill in FIG. 14.

FIG. 15 shows a detailed view of the asymmetric multi-tip drilling part of the twist drill in FIG. 14. Different from the above-mentioned embodiment, each step segment portion comprises two curved segments, so that each cutting edge (curved major cutting edge 188 and curved minor cutting edge 190) is configured in a concave arc shape when viewed in cross-section or from the side. Besides, an asymmetric cutting-edge tips 49, major cutting edges 188 and minor cutting edges 190 located on the second step segment can be seen. However, the cutting-edge tips 49 of the drill tip segment at the foremost end and the last transition segment 128, 130 are symmetrical.

Besides, it is also conceivable to apply this asymmetric multi-tip drilling part 20 to another hole processing drill bit for another hole processing combination.

Referring to the above description of the embodiments of the present invention, characteristics or advantageous technical effect of the asymmetric multi-tip drilling part 20 of the present invention include but are not limited to: 1) simultaneous and symmetrical cutting of the symmetrical cutting edges of the symmetrical multi-tip drilling part 20 is changed into misaligned cutting, so that the cutting edges cut asynchronously and asymmetrically to form a composite cutting effect, 2) resonance problem at the same frequency caused by the symmetrically distributed cutting force of the symmetrical multi-tip drilling part 20 is improved, so that the cutting of the tool is stable, and the service life of the tool is extended and prolonged, 3) compared with the symmetrical multi-tip drilling part 20 with the same number of step segments Tn, the number of step segments Tn participating in actual cutting is increased, the metal cutting remaining amount is refined and dispersed, and the power of power tool, especially the physical strength and efficiency during hand-held processing, is reduced, 4) the axial offset structure makes the adjacent cutting edges on the same side have a longer space in the axial direction, which increases the chip allowance rate and makes the chip discharge smoother. Especially at the small-diameter step, the chip-discharging flute 3 is narrow, and disadvantageous to chip discharge, but the offset arrangement of cutting edges increases a space between adjacent cutting edges on the same side, thus obtaining a larger chip allowance space and being more advantageous to chip discharge, and 5) cutting edges at that steps with larger diameters are symmetrically arranged, so that the major cutting edge 7 bearing larger cutting force is balanced in radial cutting, stabilizing the working rotational axis 10 during drilling, avoiding the hole axis deviation, and ensuring the diametrical accuracy of the hole.

A prominent characteristic of the asymmetric multi-tip drilling part 20 according to the present invention is that at least one symmetrical cutting edge in the prior art is changed into a offset-structure cutting edge, thereby bringing the following beneficial effect further including: 1) during the whole cutting process, the cutting force is small, uniform and appropriate, and the chip discharge is smooth, 2) the manual hand-held electric tool with an asymmetric multi-tip drilling part 20 is stable, consumes less power and can be operated for a long time, 4) cutting edges of individual step segments Tn of the tool wear uniformly, which prolongs the service life of the tool, 5) unnecessary damage of the tool in use and rejected workpieces are reduced, 6) processing difficulty and cost are reduced, and processing efficiency is improved, and 7) stable and smooth cutting.

Aspects of the present specification may also be described as follows:

A drill point arrangement comprising a drill point body comprising an acute geometry that is substantially conical from a front tip to a base and having an axis of rotation; a first flute extending from the front tip to at least the base; a second flute extending from the front tip to at least the base; a first land and a second land, the first land at least partially defined by the first flute and the second land at least partially defined by the second flute; a first step is formed into the first land and comprises a first transverse step segment adjoining a first parallel step segment; a first cutting tip at least partially defined by the first transverse step segment, the first parallel step segment, and the first flute, the first cutting tip being positioned a first radial distance measured from the axis of rotation, the first cutting tip being positioned a first axial distance measured from the front tip; a second step is formed into the second land and comprises a second transverse step segment adjoining a second parallel step segment; and a second cutting tip at least partially defined by the second transverse step segment, the second parallel step segment, and the second flute, the second cutting tip being positioned a second radial distance measured from the axis of rotation, the second cutting tip being positioned a second axial distance measured from the front tip; wherein the second cutting tip is positioned next in cutting tip sequence to the first cutting tip, and the second radial distance of the second cutting tip is greater than the first radial distance of the first cutting tip; and wherein the second axial distance of the second cutting tip is greater than the first axial distance of the first cutting tip.

The drill point arrangement of one or more embodiments where a first major cutting edge of the first step is defined by the intersection of the first transverse step segment and the first flute; a first minor cutting edge of the first step is defined by the intersection of the first parallel step segment and the first flute; the first cutting tip is further defined by the intersection of the first major cutting edge and the first minor cutting edge; a second major cutting edge of the second step is defined by the intersection of the second transverse step segment and the second flute; a second minor cutting edge of the second step is defined by the intersection of the second parallel step segment and the second flute; and the second cutting tip is further defined by the intersection of the second major cutting edge and the second minor cutting edge.

The drill point arrangement of one or more embodiments where a drill tip point is situated at the front tip of the drill point body and comprises a first primary cutting edge similar to and opposing a second primary cutting edge; a first drill tip minor cutting edge extending rearward from the first primary cutting edge to the first major cutting edge, the first drill tip minor cutting edge being at least partially defined by the first land and the first flute; and a second drill tip minor cutting edge extending rearward from the second primary cutting edge to the second major cutting edge, the second drill tip minor cutting edge being at least partially defined by the second land and the second flute, the second drill tip minor cutting edge being longer than the first drill tip minor cutting edge.

The drill point arrangement of one or more embodiments where the first drill tip minor cutting edge is adjoining the first transverse step segment of the first step, and the second drill tip minor cutting edge is adjoining the second transverse step segment of the second step.

The drill point arrangement of one or more embodiments where the first flute and the second flute are spirally arranged.

The drill point arrangement of one or more embodiments where the first cutting tip and second cutting tip are arranged substantially diametrically opposite to one another.

The drill point arrangement of one or more embodiments where a drill point body comprising an acute geometry that is substantially conical from a front tip to a base and having an axis of rotation; a first flute extending from the front tip to at least the base; a second flute extending from the front tip to at least the base; a first land and a second land, the first land at least partially defined by the first flute and the second land at least partially defined by the second flute; a first cutting tip at least partially defined by the first flute and the first land, the first cutting tip being positioned a first radial distance measured from the axis of rotation; and a second cutting tip at least partially defined by the second flute and the second land, the second cutting tip being positioned a second radial distance measured from the axis of rotation, the second cutting tip is positioned next in cutting tip sequence to the first cutting tip, and the second radial distance of the second cutting tip is greater than the first radial distance of the first cutting tip.

The drill point arrangement of one or more embodiments where the first cutting tip is positioned a first axial distance measured from the front tip and the second cutting tip is positioned a second axial distance measured from the front tip, the second axial distance of the second cutting tip is greater than the first axial distance of the first cutting tip.

The drill point arrangement of one or more embodiments where a first step is formed into the first land and comprises a first transverse step segment adjoining a first parallel step segment wherein a first major cutting edge is defined by the intersection of the first transverse step segment and the first flute; a first minor cutting edge is defined by the intersection of the first parallel step segment and the first flute; and the first cutting tip is further defined by the intersection of the first major cutting edge and the first minor cutting edge; and a second step is formed into the second land and comprises a second transverse step segment adjoining a second parallel step segment wherein a second major cutting edge is defined by the intersection of the second transverse step segment and the second flute; a second minor cutting edge is defined by the intersection of the second parallel step segment and the second flute; and the second cutting tip is further defined by the intersection of the second major cutting edge and the second minor cutting edge.

The drill point arrangement of one or more embodiments where a first axial distance is measured from the front tip to the first cutting tip; a second axial distance is measured from the front tip to the second cutting tip; a first prior minor cutting edge is prior in cutting sequence to and adjoining the first major cutting edge; a second prior minor cutting edge is prior in cutting sequence to and adjoining the second major cutting edge; wherein the second axial distance of the second cutting tip is greater than the first axial distance of the first cutting tip due to at least one of the first major cutting edge being shorter than the second major cutting edge or the first prior minor cutting edge being shorter than the second prior minor cutting edge.

The drill point arrangement of one or more embodiments where the second radial distance of the second cutting tip is greater than the first radial distance of the first cutting tip due to the first major cutting edge being shorter than the second major cutting edge.

The drill point arrangement of one or more embodiments where a third cutting tip is at least partially defined by the first flute and the first land and is positioned next in cutting tip sequence to the second cutting tip, the third cutting tip being positioned a third radial distance measured from the axis of rotation, the third radial distance of the third cutting tip is greater than the second radial distance of the second cutting tip; and a fourth cutting tip is at least partially defined by the second flute and the second land and is positioned next in cutting tip sequence to the third cutting tip, the fourth cutting tip being positioned a fourth radial distance measured from the axis of rotation, the fourth radial distance of the fourth cutting tip is greater than the third radial distance of the third cutting tip.

The drill point arrangement of one or more embodiments where the third cutting tip is positioned a third axial distance measured from the front tip and the fourth cutting tip is positioned a fourth axial distance measured from the front tip, the fourth axial distance of the fourth cutting tip is greater than the third axial distance of the third cutting tip.

The drill point arrangement of one or more embodiments where a fifth cutting tip is at least partially defined by the first flute and the first land and is positioned next in cutting tip sequence to the fourth cutting tip, the fifth cutting tip being positioned a fifth radial distance measured from the axis of rotation, the fifth radial distance of the fifth cutting tip is greater than the fourth radial distance of the fourth cutting tip; and a sixth cutting tip is at least partially defined by the second flute and the second land and is in simultaneous cutting tip sequence with the fifth cutting tip, the sixth cutting tip being positioned a sixth radial distance measured from the axis of rotation, the sixth radial distance of the sixth cutting tip is equal to the fifth radial distance of the fifth cutting tip.

The drill point arrangement of one or more embodiments where the fifth cutting tip is positioned a fifth axial distance measured from the front tip and the sixth cutting tip is positioned a sixth axial distance measured from the front tip, the sixth axial distance of the sixth cutting tip is equal to the fifth axial distance of the third cutting tip.

The drill point arrangement of one or more embodiments where the first transverse step segment comprises a first truncated cone section and the first parallel step segment comprises a first cylindrical section, with the first truncated cone section adjoining the first cylindrical section; and the second transverse step segment comprises a second truncated cone section and the second parallel step segment comprises a second cylindrical section, with the second truncated cone section adjoining the second cylindrical section.

A method to reduce resonance between a first cutting edge opposing a second cutting edge, comprising providing a drill point arrangement integral to the cutting tool, the drill point arrangement comprising a drill point body comprising an acute geometry that is substantially conical from a front tip to a base and having an axis of rotation; a first flute extending from the front tip to at least the base; a second flute extending from the front tip to at least the base; a first land and a second land, the first land at least partially defined by the first flute and the second land at least partially defined by the second flute; a first cutting tip at least partially defined by the first cutting edge, the first flute, and the first land, the first cutting tip being positioned a first radial distance measured from the axis of rotation, the first cutting tip being positioned a first axial distance measured from the front tip; and a second cutting tip at least partially defined by the second cutting edge, the second flute and the second land, the second cutting tip being positioned a second radial distance measured from the axis of rotation, the second cutting tip being positioned a second axial distance measured from the front tip, the second cutting tip being positioned a second axial distance measured from the front tip; arranging the second cutting tip such that the second radial distance of the second cutting tip is greater than the first radial distance of the first cutting tip; and arranging the second cutting tip such that the second axial distance of the second cutting tip is greater than the first axial distance of the first cutting tip to reduce resonance between a first cutting edge and an opposing second cutting edge.

The method of one or more embodiments where the first cutting tip and second cutting tip are arranged substantially diametrically opposite to one another.

The method of one or more embodiments further comprising providing a third cutting tip at least partially defined by a third cutting edge, the first flute and the first land, the third cutting tip being positioned a third radial distance measured from the axis of rotation, the third cutting tip being positioned a third axial distance measured from the front tip; arranging the third cutting tip next in cutting tip sequence to the second cutting tip; arranging the third cutting tip such that the third radial distance of the third cutting tip is greater than the second radial distance of the second cutting tip; arranging the third cutting tip such that the third axial distance of the third cutting tip is greater than the second axial distance of the second cutting tip; providing a fourth cutting tip at least partially defined by a fourth cutting edge, the second flute and the second land, the fourth cutting tip being positioned a fourth radial distance measured from the axis of rotation, the fourth cutting tip being positioned a fourth axial distance measured from the front tip; arranging the fourth cutting tip next in cutting tip sequence to the third cutting tip; arranging the fourth cutting tip such that the fourth radial distance of the third cutting tip is greater than the third radial distance of the third cutting tip; and arranging the fourth cutting tip such that the fourth axial distance of the fourth cutting tip is greater than the third axial distance of the third cutting tip.

The method of one or more embodiments further comprising providing a fifth cutting tip at least partially defined by a fifth cutting edge, the first flute and the first land, the fifth cutting tip being positioned a fifth radial distance measured from the axis of rotation, the fifth cutting tip being positioned a fifth axial distance measured from the front tip; arranging the fifth cutting tip next in cutting tip sequence to the fourth cutting tip; arranging the fifth cutting tip such that the fifth radial distance of the fifth cutting tip is greater than the fourth radial distance of the fourth cutting tip; arranging the fifth cutting tip such that the fifth axial distance of the fifth cutting tip is greater than the fourth axial distance of the fourth cutting tip; providing a sixth cutting tip at least partially defined by a sixth cutting edge, the second flute and the second land, the sixth cutting tip being positioned a sixth radial distance measured from the axis of rotation, the sixth cutting tip being positioned a sixth axial distance measured from the front tip; arranging the sixth cutting tip simultaneous in cutting tip sequence to the fifth cutting tip; arranging the sixth cutting tip such that the sixth radial distance of the sixth cutting tip is equal to the fifth radial distance of the fifth cutting tip; arranging the sixth cutting tip such that the sixth axial distance of the sixth cutting tip is equal to the sixth axial distance of the sixth cutting tip.

A drill point arrangement comprising a drill point body comprising an acute geometry that is substantially conical from a front tip to a base and having an axis of rotation; a drill tip point is situated at the front tip of the drill point body and comprises a first primary cutting edge similar to and opposing a second primary cutting edge, the first primary cutting edge and the second primary cutting edge having a synchronous cutting sequence; a first flute extending from the front tip to at least the base; a second flute extending from the front tip to at least the base; a first land and a second land, the first land at least partially defined by the first flute and the second land at least partially defined by the second flute; a first cutting tip being at least partially defined by a first step formed into the first land and the first flute, the first cutting tip being positioned a first radial distance measured from the axis of rotation, the first cutting tip being positioned a first axial distance measured from the front tip; a second cutting tip being at least partially defined by a second step formed into the second land and the second flute, the second cutting tip being positioned a second radial distance measured from the axis of rotation, the second cutting tip being positioned a second axial distance measured from the front tip, the second cutting tip is positioned next in cutting tip sequence to the first cutting tip, the second radial distance of the second cutting tip is greater than the first radial distance of the first cutting tip, and the second axial distance of the second cutting tip is greater than the first axial distance of the first cutting tip; a third cutting tip being at least partially defined by a third step formed into the first land and the first flute, the third cutting tip is positioned subsequent in cutting tip sequence to the second cutting tip, the third cutting tip being positioned a third radial distance measured from the axis of rotation, the third cutting tip being positioned a third axial distance measured from the front tip, the third radial distance of the third cutting tip is greater than the second radial distance of the second cutting tip, and the third axial distance of the third cutting tip is greater than the second axial distance of the second cutting tip; a fourth cutting tip being at least partially defined by a fourth step formed into the second land and the second flute, the fourth cutting tip is positioned next in cutting tip sequence to the third cutting tip, the fourth cutting tip being positioned a fourth axial distance measured from the front tip, the fourth cutting tip being positioned a fourth radial distance measured from the axis of rotation, the fourth radial distance of the fourth cutting tip is equal to the third radial distance of the third cutting tip, and the fourth axial distance of the fourth cutting tip is equal to the third axial distance of the third cutting tip.

The drill point arrangement of one or more embodiments further comprising a fifth cutting tip being at least partially defined by a fifth step formed into the first land and the first flute, the fifth cutting tip being positioned a fifth radial distance measured from the axis of rotation, the fifth cutting tip being positioned a fifth axial distance measured from the front tip, the fifth cutting tip is positioned in cutting tip sequence between the second cutting tip and the third cutting tip, the fifth radial distance of the fifth cutting tip is greater than the second radial distance of the second cutting tip, and the fifth axial distance of the fifth cutting tip is greater than the second axial distance of the second cutting tip; and a sixth cutting tip being at least partially defined by a sixth step formed into the second land and the second flute, the sixth cutting tip being positioned a sixth radial distance measured from the axis of rotation, the sixth cutting tip being positioned a sixth axial distance measured from the front tip, the sixth cutting tip is positioned next in cutting tip sequence to the fifth cutting tip and prior to the third cutting tip, the sixth radial distance of the sixth cutting tip is greater than the fifth radial distance of the fifth cutting tip, and the sixth axial distance of the sixth cutting tip is greater than the fifth axial distance of the fifth cutting tip.

The drill point arrangement of one or more embodiments further comprising a seventh cutting tip being at least partially defined by a seventh step formed into the second land and the first flute, the seventh cutting tip being positioned a seventh radial distance measured from the axis of rotation, the seventh cutting tip being positioned a seventh axial distance measured from the front tip, the seventh cutting tip is positioned next in cutting tip sequence to the six cutting tip and prior to the third cutting tip, the seventh radial distance of the seventh cutting tip is greater than the sixth radial distance of the sixth cutting tip, and the seventh axial distance of the seventh cutting tip is greater than the sixth axial distance of the sixth cutting tip.

The drill point arrangement of one or more embodiments wherein a first drill tip minor cutting edge extends rearward from the first primary cutting edge, the first drill tip minor cutting edge being at least partially defined by the first land and the first flute; and a second drill tip minor cutting edge extends rearward from the second primary cutting edge to the second major cutting edge, the second drill tip minor cutting edge being at least partially defined by the second land and the second flute, the second drill tip minor cutting edge being longer than the first drill tip minor cutting edge.

A drilling part for a hole processing tool comprising: at least two chip-discharging flutes arranged at an interval in a circumferential direction of the drilling part, a plurality of sides, each side being defined by two adjacent chip-discharging flutes in the circumferential direction, wherein each side comprises a plurality of step segment portions arranged in succession in a feeding direction, and each step segment portion comprises a first segment and a second segment immediately adjacent to the first segment, wherein, in condition that the step segment portions of each side are sequentially numbered against the feeding direction, the step segment portions of the same serial number on all sides form a single step segment, wherein each side further comprises a transition segment portion after all the step segment portions, a plurality of major cutting edges, the major cutting edges being formed by chip-discharging flutes intersecting with the first segments of the step segment portions and with the transition segment portions, a plurality of minor cutting edges, the minor cutting edges being formed by chip-discharging flutes intersecting with the second segments of the step segment portions, and a plurality of cutting-edge tips each formed by the major cutting edge intersecting with the minor cutting edge which are formed by the same chip-discharging flute and the same step segment portion, wherein at least one of the step segments is formed as an asymmetric step segment, and a single asymmetric step segment having at least two asymmetric step segment portions separated by the chip-discharging flutes in the circumferential direction, the at least two asymmetrical step segment portions and at least two chip-discharging flutes forming correspondingly at least two asymmetrical cutting-edge tips which are not rotationally symmetrical about the working rotational axis, the at least two asymmetrical cutting-edge tips thus having different radial distances from the working rotational axis and being axially offset relative to each other in the direction of the working rotational axis.

The drilling part according to one or more embodiments where the drilling part is formed as a drilling part at a foremost end of the hole processing tool, wherein the first one of the step segments at the foremost end is formed as a drill tip segment, a point of the drill tip segment at the foremost end in the feeding direction is formed as a drill tip point, and asymmetric cutting-edge tips on the same asymmetric step segment have different axial distances from the drill tip point.

The drilling part according to one or more embodiments where the cutting-edge tips of the drill tip segment are formed to be rotationally symmetric about the working rotational axis, and thus have the same radial distance from the working rotational axis and the same axial distance from the drill tip point.

The drilling part according to one or more embodiments where among step segments of the drilling part after the drill tip segment, at least one step segment of a first half number of step segments is formed as an asymmetric step segment.

The drilling part according to one or more embodiments where among step segments of the drilling part after the drill tip segment, at least two immediately adjacent step segments of the first half number of step segments are formed as asymmetric step segments.

The drilling part according to one or more embodiments where two immediately adjacent step segments immediately adjoining the drill tip segment of the drilling part are formed as asymmetric step segments.

The drilling part according to one or more embodiments where the step segment immediately adjoining the drill tip segment of the drilling part is formed as an asymmetric step segment.

The drilling part according to one or more embodiments where the plurality of sides each have the same number of step segment portions, wherein, among step segments of the drilling part after the drill tip segment, at least one step segment in a second half number of step segments is formed as a symmetrical step segment, and the cutting-edge tips on the symmetrical step segment are formed to have the same radial distance from the working rotational axis and the same axial distance from the drill tip point.

The drilling part according to one or more embodiments where among step segments of the drilling part after the drill tip segment, at least two immediately adjacent step segments of the second half number of step segments are formed as symmetric step segments.

The drilling part according to one or more embodiments where among step segments of the drilling part after the drill tip segment, the last two immediately adjacent step segments of the second half number of step segments are formed as symmetric step segments.

The drilling part according to one or more embodiments where the last one step segment of the drilling part is formed as a symmetrical step segment.

The drilling part according to one or more embodiments where at least two sides have different numbers of step segment portions, and in the at least two sides, the cutting-edge tip on one step segment portion of one side and the cutting-edge tip on one step segment portion of the other side with a different serial number from said one step segment portion of the one side have the same radial distance from the working rotational axis and are not axially offset relative to each other in the direction of the working rotational axis.

The drilling part according to one or more embodiments where the cutting-edge tips of the last step segment portions of the at least two sides have the same radial distance from the working rotational axis and are not axially offset relative to each other in the direction of the working rotational axis.

The drilling part according to one or more embodiments where the transition segment portions of the sides have the same radial distance from the working rotational axis and are not axially offset relative to each other in the direction of the working rotational axis.

The drilling part according to one or more embodiments where the first segment is formed as a truncated cone segment and the second segment is formed as a cylindrical segment; or, the first segment and/or the second segment are formed as curved segments.

The drilling part according to one or more embodiments where the number of step segments of the drilling part is greater than or equal to 3.

The drilling part according to one or more embodiments where the number of step segments of the drilling part is greater than or equal to 5.

The drilling part according to one or more embodiments where an included angle between the major cutting edges of the drill tip segment is greater than a cone angle of the conical drilling part.

The drilling part according to one or more embodiments where the included angle between the major cutting edges of the drill tip segment is obtuse, and the cone angle of the drilling part is acute.

The drilling part according to one or more embodiments where the chip-discharging flutes are linear or spiral shaped.

The drilling part according to one or more embodiments where at least one major cutting edge is formed as a multi-segment edge, and each segment edge is linear or arc-shaped.

A hole processing tool according to one or more embodiments comprising a shank portion for fixing the hole processing tool and an operation portion for hole processing in front of the shank portion, the operation portion having, at a foremost end thereof, the drilling part.

The hole processing tool according to one or more embodiments where the hole processing tool is formed as a twist drill, the operation portion having a guide portion adjoining the shank portion and the drilling part adjoining the guide portion in front of the guide portion, wherein the chip discharging flutes extend on at least part of the guide portion.

The hole processing tool according to one or more embodiments where the chip discharging flutes extend on a substantial part of the guide portion.

The hole processing tool according to one or more embodiments where the hole processing tool is formed as a pagoda or step drill bit or multidiameter drill bit, the operation portion comprising a plurality of stepped drilling/reaming portions which are sequentially arranged in the feeding direction and have increasing diameters, wherein the foremost first drilling portion is provided with the drilling part.

The hole processing tool according to one or more embodiments where the hole processing tool is formed as a chamfering and drilling integrated drill bit, the operation portion having the drilling part at the foremost end, a stepped hole drilling portion for drilling a stepped hole after and spaced from the drilling part by an axial distance, and a hole chamfering portion for chamfering the drilled stepped hole after and spaced from the stepped hole drilling portion by an axial distance.

The hole processing tool according to one or more embodiments where the hole processing tool is formed as a composite tap drill bit, the operation portion having the drilling part at the foremost end thereof, a tapping portion for tapping the hole after and spaced from the drilling part by an axial distance, and a hole chamfering portion for chamfering the hole after and spaced from the tapping portion by an axial distance.

The hole processing tool according to one or more embodiments where the hole processing tool is formed as an umbrella-shaped drill bit, the operation portion having the drilling part at the foremost end, and a reaming portion immediately adjacent to and after the drilling part.

The hole processing tool according to one or more embodiments where the hole processing tool is formed as a saw drill bit, the operation portion having the drilling part at the foremost end, and a serrated operation portion after and spaced from the drilling part by an axial distance.

Aspects of the present invention teach certain benefits in construction and use which give rise to the exemplary advantages described below.

According to one aspect of the present invention, a drilling part for a hole processing tool is provided, which drilling part is characterized by comprising:

- at least two chip-discharging flutes arranged at an interval in a circumferential direction of the drilling part,
- a plurality of sides, each side being defined by two adjacent chip-discharging flutes in the circumferential direction, wherein each side comprises a plurality of step segment portions arranged in succession in a feeding direction, and each step segment portion comprises a first segment and a second segment immediately adjacent to the first segment, wherein, in condition that the step segment portions of each side are sequentially numbered against the feeding direction, the step segment portions of the same serial number on all sides form a single step segment, wherein each side further comprises a transition segment portion after all the step segment portions,
- a plurality of major cutting edges, the major cutting edges being formed by chip-discharging flutes intersecting with the first segments of the step segment portions and with the transition segment portions,
- a plurality of minor cutting edges, the minor cutting edges being formed by chip-discharging flutes intersecting with the second segments of the step segment portions, and a plurality of cutting-edge tips each formed by the major cutting edge intersecting with the minor cutting edge which are formed by the same chip-discharging flute and the same step segment portion,
- wherein at least one of the step segments is configured as an asymmetric step segment, and a single asymmetric step segment having at least two asymmetric step segment portions separated by the chip-discharging flutes in the circumferential direction, the at least two asymmetrical step segment portions and at least two chip-discharging flutes forming correspondingly at least two asymmetrical cutting-edge tips which are not rotationally symmetrical about the working rotational axis, the at least two asymmetrical cutting-edge tips thus having different radial distances from the working rotational axis and being axially offset relative to each other in the direction of the working rotational axis.

Technical effects that can be produced by the drilling part of the hole processing tool include, but are not limited to, that the asymmetric step segment of the drilling part can realize offset cutting, so that the cutting edges cut asymmetrically not at the same time to form a composite cutting effect, so that the amount of metal removed is gradually decomposed and cut off, so that the drilling is efficient and labor-saving. In addition, since cutting force is not strictly symmetrically distributed on the circumference, it will not produce cutting resonance with the same frequency and period.

Advantageously, the drilling part is formed as a drilling part at a foremost end of the hole processing tool, wherein the first one of the step segments at the foremost end is formed as a drill tip segment, a point of the drill tip segment at the foremost end in the feeding direction is formed as a drill tip point, and asymmetric cutting-edge tips on the same asymmetric step segment have different axial distances from the drill tip point.

Advantageously, the cutting-edge tips of the drill tip segment are configured to be rotationally symmetric about the working rotational axis, and thus have the same radial distance from the working rotational axis and the same axial distance from the drill tip point.

Advantageously, among step segments of the drilling part after the drill tip segment, at least one step segment of a first half number of step segments is configured as an asymmetric step segment. Here, it can be understood that all the step segments (including the foremost drill tip segment) are numbered in sequence against the feeding direction, and at least one of the first half step segments of all the step segments after the drill tip segment is formed as an asymmetric step segment. For example, for a drilling part with five step segments (including the foremost drill tip segment), "a first half number" is (5−1)÷2=2, which means that at least one step segment in second and third step segments is formed as an asymmetric step segment; for a drilling part with six step segments (including the foremost drill tip segment), "a first half number" is (6−1)÷2=2.5≈3, which means that at least one of the second, third and fourth step segments is formed as an asymmetric step segment. And so on.

Advantageously, among step segments of the drilling part after the drill tip segment, at least two immediately adjacent step segments of the first half number of step segments are formed as asymmetric step segments.

Advantageously, two immediately adjacent step segments immediately adjoining the drill tip segment of the drilling part are formed as asymmetric step segments.

Advantageously, the one step segment immediately adjoining the drill tip segment of the drilling part is formed as asymmetric step segment.

Advantageously, the plurality of sides each have the same number of step segment portions, wherein, among step segments of the drilling part after the drill tip segment, at least one step segment in the second half number of step segments is formed as a symmetrical step segment, and the cutting-edge tips on the symmetrical step segment are formed to have the same radial distance from the working rotational axis and the same axial distance from the drill tip point. Here, it can be understood that all the step segments (including the foremost drill tip segment) are numbered in sequence against the feeding direction, and at least one of the second half step segments of all the step segments after the drill tip segment is formed as a symmetric step segment. For example, for a drilling part with five step segments (including the foremost drill tip segment), "a second half number" is (5−1)÷2=2, which means that at least one step segment in fourth and fifth step segments is formed as a symmetric step segment; for a drilling part with six step segments (including the foremost drill tip segment), "a second half number" is (6−1)÷2=2.5≈3, which means that at least one of the fourth, fifth and sixth step segments is formed as a symmetric step segment. And so on.

Advantageously, among step segments of the drilling part after the drill tip segment, at least two immediately adjacent step segments of the second half number of step segments are formed as symmetric step segments.

Advantageously, among step segments of the drilling part after the drill tip segment, the last two immediately adjacent step segments of the second half number of step segments are formed as symmetric step segments.

Advantageously, the last one step segment of the drilling part is configured as a symmetrical step segment.

Advantageously, at least two sides have different numbers of step segment portions, and in the at least two sides, the cutting-edge tip on one step segment portion of one side and the cutting-edge tip on one step segment portion of the other side with a different serial number from said one step segment portion of the one side have the same radial distance from the working rotational axis and are not axially offset relative to each other in the direction of the working rotational axis.

Advantageously, the cutting-edge tips of the last step segment portions of the at least two sides have the same radial distance from the working rotational axis and are not axially offset relative to each other in the direction of the working rotational axis.

Advantageously, the transition segment portions of the sides (or the major cutting edges thereon, for example, the front ends and/or rear ends of the major cutting edges) have the same radial distance from the working rotational axis and are not axially offset relative to each other in the direction of the working rotational axis.

Advantageously, the first segment is formed as a truncated cone segment and the second segment is formed as a cylindrical segment; or, the first segment and/or the second segment are formed as curved segments.

Advantageously, the number of step segments of the drilling part is greater than or equal to 3.

Advantageously, the number of step segments of the drilling part is greater than or equal to 5.

Advantageously, an included angle between the major cutting edges of the drill tip segment is greater than a cone angle of the conical drilling part.

Advantageously, the included angle between the major cutting edges of the drill tip segment is obtuse, and the cone angle of the drilling part is acute.

Advantageously, the chip-discharging flutes are linear or spiral shaped.

Advantageously, at least one major cutting edge is formed as a multi-segment edge, and each segment edge is linear or arc-shaped.

According to another aspect of the present invention, there is provided a drilling part for a hole processing tool, characterized in that the hole processing tool comprises a shank portion for fixing the hole processing tool and an operation portion for hole processing in front of the shank portion, the operation portion having a drilling part according to the present invention at a foremost end thereof.

Advantageously, the hole processing tool is formed as a twist drill, the operation portion having a guide portion adjoining the shank portion and the drilling part adjoining the guide portion in front of the guide portion, wherein the chip discharging flutes extend on at least part of the guide portion.

Advantageously, the chip discharging flutes extend on a substantial part of the guide portion.

Advantageously, the hole processing tool is formed as a pagoda drill, the operation portion comprising a plurality of stepped drilling/reaming portions which are sequentially arranged in the feeding direction and have increasing diameters, wherein the foremost first drilling portion is provided with the drilling part.

Advantageously, the hole processing tool is formed as a chamfering and drilling integrated drill bit, the operation portion having the drilling part at the foremost end thereof, a stepped hole drilling portion for drilling a stepped hole after and spaced from the drilling part by an axial distance, and a hole chamfering portion for chamfering the drilled stepped hole after and spaced from the stepped hole drilling portion by an axial distance.

Advantageously, the hole processing tool is formed as a composite tap drill bit, the operation portion having the drilling part at the foremost end thereof, a tapping portion for tapping the hole after and spaced from the drilling part by an axial distance, and a hole chamfering portion for chamfering the hole after and spaced from the tapping portion by an axial distance.

Advantageously, the hole processing tool is formed as an umbrella-shaped drill bit, the operation portion having the drilling part at the foremost end, and a reaming portion immediately adjacent to and after the drilling part.

Advantageously, the hole processing tool is formed as a saw drill bit, the operation portion having the drilling part at the foremost end, and a serrated operation portion after and spaced from the drilling part by an axial distance.

The technical features mentioned above, the technical features to be mentioned below and the technical features shown in the drawings can be arbitrarily combined with each other as long as the combined technical features are not contradictory. All technically feasible feature combinations are included in technical contents recited in the description.

The present invention may include any feature or combination of features implicitly or explicitly disclosed herein or a generic concept thereof, and is not limited to any defined scope as listed above. Any elements, features and/or structural arrangements described herein may be combined in any suitable manner.

The specific embodiments disclosed above are merely exemplary, and it will be apparent to those skilled in the art who benefit from the teachings herein that the present invention can be modified and implemented in different but equivalent manners. It is therefore obvious that changes and modifications can be made to the specific embodiments as disclosed above, and all these variations are considered to fall within the scope and spirit of the present invention.

What is claimed is:

1. A drill point arrangement comprising:

a drill point body comprising an acute geometry that is conical from a front tip to a base and having an axis of rotation;

a first flute extending from the front tip to at least the base;

a second flute extending from the front tip to at least the base;

a first land and a second land, the first land at least partially defined by the first flute and the second land at least partially defined by the second flute;

a first step is formed into the first land and comprises a first transverse step segment adjoining a first parallel step segment;

a first cutting tip at least partially defined by the first transverse step segment, the first parallel step segment, and the first flute, the first cutting tip being positioned a first radial distance measured from the axis of rotation, the first cutting tip being positioned a first axial distance measured from the front tip;

a second step is formed into the second land and comprises a second transverse step segment adjoining a second parallel step segment; and a second cutting tip at least partially defined by the second transverse step segment, the second parallel step segment, and the second flute, the second cutting tip being positioned a second radial distance measured from the axis of rotation and a second axial distance measured from the front tip;

wherein the second cutting tip is positioned next in cutting tip sequence to the first cutting tip, and the second radial distance of the second cutting tip is greater than the first radial distance of the first cutting tip;

wherein the second axial distance of the second cutting tip is greater than the first axial distance of the first cutting tip; and wherein the first cutting tip and the second cutting tip are arranged diametrically opposite and rotationally asymmetric to one another.

2. The drill point arrangement of claim 1 wherein:

a first major cutting edge of the first step is defined by an intersection of the first transverse step segment and the first flute;

a first minor cutting edge of the first step is defined by an intersection of the first parallel step segment and the first flute;

the first cutting tip is further defined by an intersection of the first major cutting edge and the first minor cutting edge;

a second major cutting edge of the second step is defined by an intersection of the second transverse step segment and the second flute;

a second minor cutting edge of the second step is defined by an intersection of the second parallel step segment and the second flute; and the second cutting tip is further defined by an intersection of the second major cutting edge and the second minor cutting edge.

3. The drill point arrangement of claim 1 wherein:

a drill tip point is situated at the front tip of the drill point body and comprises a first primary cutting edge similar to and opposing a second primary cutting edge;

a first drill tip minor cutting edge extending rearward from the first primary cutting edge to the first major cutting edge, the first drill tip minor cutting edge being at least partially defined by the first land and the first flute; and a second drill tip minor cutting edge extending rearward from the second primary cutting edge to the second major cutting edge, the second drill tip minor cutting edge being at least partially defined by the second land and the second flute, the second drill tip minor cutting edge being longer than the first drill tip minor cutting edge.

4. The drill point arrangement of claim 3 wherein the first drill tip minor cutting edge is adjoining the first transverse step segment of the first step, and the second drill tip minor cutting edge is adjoining the second transverse step segment of the second step.

5. The drill point arrangement of claim 1 wherein the first flute and the second flute are spirally arranged.

6. The drill point arrangement of claim 1 wherein:

a first prior minor cutting edge is prior in cutting sequence to and adjoining the first major cutting edge;

a second prior minor cutting edge is prior in cutting sequence to and adjoining the second major cutting edge;

wherein the second axial distance of the second cutting tip is greater than the first axial distance of the first cutting tip due to at least one of the first major cutting edge being shorter than the second major cutting edge or the first prior minor cutting edge being shorter than the second prior minor cutting edge.

7. The drill point arrangement of claim 1 wherein the second radial distance of the second cutting tip is greater than the first radial distance of the first cutting tip due to the first major cutting edge being shorter than the second major cutting edge.

8. The drill point arrangement of claim 1 wherein:

a third cutting tip is at least partially defined by the first flute and the first land and is positioned next in cutting tip sequence to the second cutting tip, the third cutting tip being positioned a third radial distance measured from the axis of rotation, the third radial distance of the third cutting tip is greater than the second radial distance of the second cutting tip; and a fourth cutting tip is at least partially defined by the second flute and the second land and is positioned next in cutting tip sequence to the third cutting tip, the fourth cutting tip being positioned a fourth radial distance measured from the axis of rotation, the fourth radial distance of the fourth cutting tip is greater than the third radial distance of the third cutting tip.

9. The drill point arrangement of claim 8 wherein the third cutting tip is positioned a third axial distance measured from the front tip and the fourth cutting tip is positioned a fourth axial distance measured from the front tip, the fourth axial distance of the fourth cutting tip is greater than the third axial distance of the third cutting tip.

10. The drill point arrangement of claim 8 wherein:

a fifth cutting tip is at least partially defined by the first flute and the first land and is positioned next in cutting tip sequence to the fourth cutting tip, the fifth cutting tip being positioned a fifth radial distance measured from the axis of rotation, the fifth radial distance of the fifth cutting tip is greater than the fourth radial distance of the fourth cutting tip; and a sixth cutting tip is at least partially defined by the second flute and the second land and is in simultaneous cutting tip sequence with the fifth cutting tip, the sixth cutting tip being positioned a sixth radial distance measured from the axis of rotation, the sixth radial distance of the sixth cutting tip is equal to the fifth radial distance of the fifth cutting tip.

11. The drill point arrangement of claim 10 wherein the fifth cutting tip is positioned a fifth axial distance measured from the front tip and the sixth cutting tip is positioned a sixth axial distance measured from the front tip, the sixth axial distance of the sixth cutting tip is equal to the fifth axial distance of the fifth cutting tip.

12. The drill point arrangement of claim 1 wherein:

the first transverse step segment comprises a first truncated cone section and the first parallel step segment comprises a first cylindrical section, with the first truncated cone section adjoining the first cylindrical section; and the second transverse step segment comprises a second truncated cone section and the second parallel step segment comprises a second cylindrical section, with the second truncated cone section adjoining the second cylindrical section.

* * * * *